United States Patent
Hwang

(10) Patent No.: US 12,302,364 B2
(45) Date of Patent: May 13, 2025

(54) METHOD AND APPARATUS FOR CHANNEL RESOURCE MANAGEMENT IN WIRELESS COMMUNICATION SYSTEM

(71) Applicant: ELECTRONICS AND TELECOMMUNICATIONS RESEARCH INSTITUTE, Daejeon (KR)

(72) Inventor: Hyun Gu Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 664 days.

(21) Appl. No.: 17/502,750

(22) Filed: Oct. 15, 2021

(65) Prior Publication Data
US 2022/0124676 A1    Apr. 21, 2022

(30) Foreign Application Priority Data

Oct. 15, 2020 (KR) .................. 10-2020-0133800
Oct. 14, 2021 (KR) .................. 10-2021-0136758

(51) Int. Cl.
H04W 4/00   (2018.01)
H04W 24/08  (2009.01)
(Continued)

(52) U.S. Cl.
CPC ........... *H04W 72/30* (2023.01); *H04W 24/08* (2013.01); *H04W 72/0446* (2013.01); *H04W 72/0453* (2013.01); *H04W 72/51* (2023.01)

(58) Field of Classification Search
CPC . H04W 72/30; H04W 24/08; H04W 72/0446; H04W 72/0453; H04W 72/51;
(Continued)

(56) References Cited

U.S. PATENT DOCUMENTS 7,876,701 B2   1/2011  Li et al.
8,744,465 B2   6/2014  Teague et al.
(Continued)

FOREIGN PATENT DOCUMENTS

IN   201817025368   10/2018
KR   10-2019-0101284   8/2019
(Continued)

*Primary Examiner* — Saumit Shah
*Assistant Examiner* — Hidayat Dabiri
(74) *Attorney, Agent, or Firm* — KILE PARK REED & HOUTTEMAN PLLC

(57) ABSTRACT

A channel resource management method performed by a first communication node in a communication system may comprise: monitoring channel information broadcast packets transmitted from other communication nodes; receiving a first broadcast packet, which is a channel information broadcast packet transmitted from a third communication node that is included in the other communication nodes and performs one-to-one communication with a second communication node included in the other communication nodes; and managing a one-to-one channel resource for one-to-one communication with a fourth communication node included in the other communication nodes based on information included in the first broadcast packet, wherein the first broadcast packet includes information on a first one-to-one channel resource allocated for one-to-one communication between the second and third communication nodes.

17 Claims, 16 Drawing Sheets

(51) Int. Cl.
*H04W 72/0446* (2023.01)
*H04W 72/0453* (2023.01)
*H04W 72/30* (2023.01)
*H04W 72/51* (2023.01)

(58) Field of Classification Search
CPC ......... H04W 72/23; H04W 40/20–205; H04W 56/006; H04W 4/02–10; H04W 28/0226; H04W 36/32–326; H04W 48/04
See application file for complete search history.

(56) References Cited

U.S. PATENT DOCUMENTS

| | | | | |
|---|---|---|---|---|
| 2004/0022224 A1* | 2/2004 | Billhartz | ............... | H04W 40/02 |
| | | | | 370/400 |
| 2004/0029553 A1* | 2/2004 | Cain | .................... | H04W 40/28 |
| | | | | 455/445 |
| 2005/0157697 A1* | 7/2005 | Lee | ...................... | H04L 45/128 |
| | | | | 370/349 |
| 2008/0069008 A1* | 3/2008 | Park | ...................... | H04W 64/00 |
| | | | | 370/254 |
| 2008/0107091 A1* | 5/2008 | Ramachandran | ..... | H04W 40/12 |
| | | | | 455/436 |
| 2013/0272170 A1* | 10/2013 | Chatterjee | ............. | H04L 5/0023 |
| | | | | 370/280 |
| 2013/0273839 A1* | 10/2013 | Breshears | ............... | H04L 45/04 |
| | | | | 455/11.1 |
| 2018/0246879 A1* | 8/2018 | Ostby | ................... | G06T 15/005 |
| 2019/0387544 A1 | 12/2019 | Hwang | | |
| 2020/0322038 A1* | 10/2020 | Mills | ................... | H04L 63/0428 |
| 2021/0084559 A1* | 3/2021 | Chaponniere | ....... | H04W 36/322 |
| 2021/0099995 A1 | 4/2021 | Hwang | | |
| 2023/0401963 A1* | 12/2023 | Xu | ....................... | G08G 5/0021 |

FOREIGN PATENT DOCUMENTS

| | | | | |
|---|---|---|---|---|
| KR | 10-2019-0122543 | 10/2019 | | |
| KR | 10-2032062 | 11/2019 | | |
| KR | 10-2021-0037521 | 4/2021 | | |
| WO | WO-2007051130 A2 * | 5/2007 | .......... | H04L 1/0003 |
| WO | 2019/164328 | 8/2019 | | |

* cited by examiner

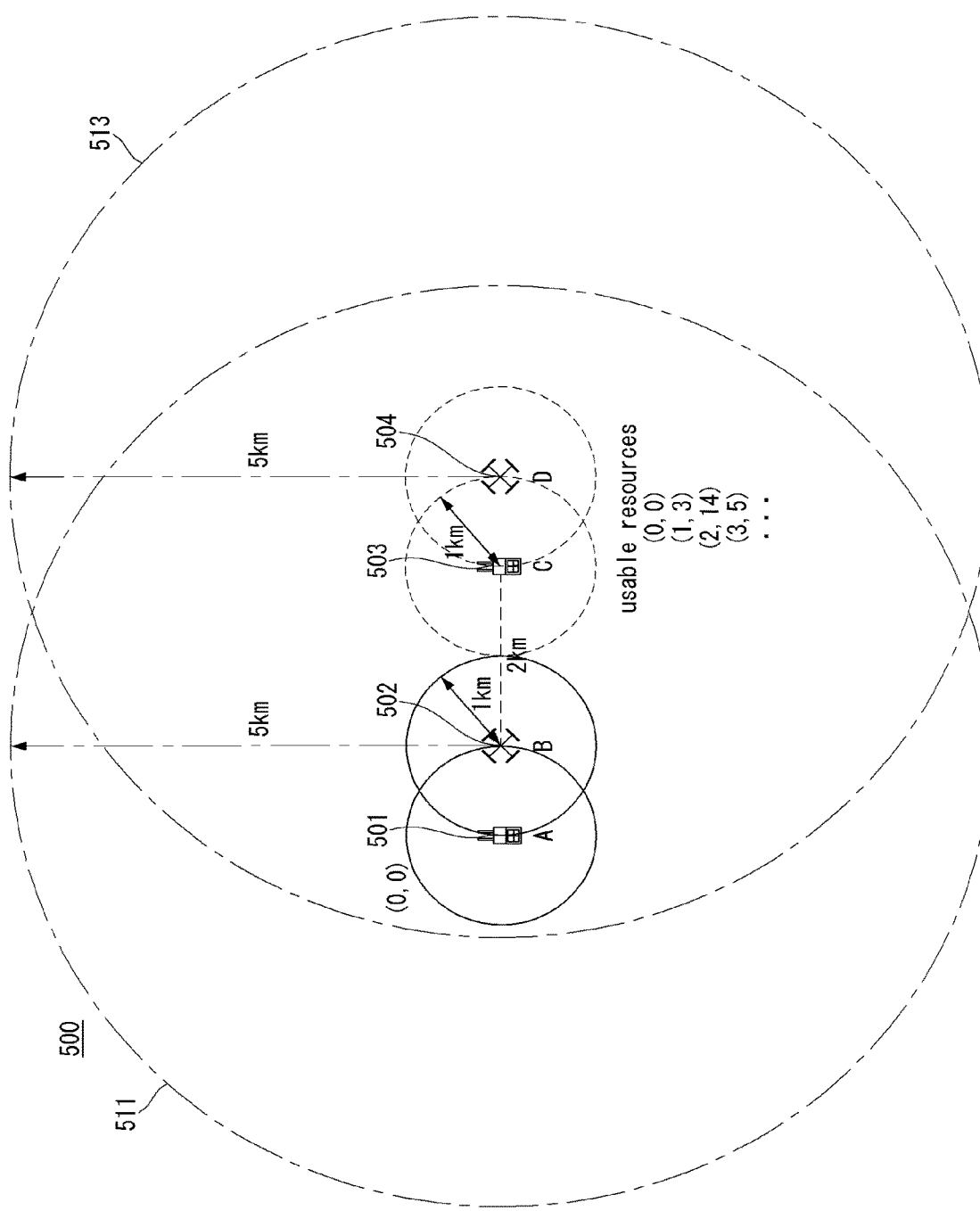

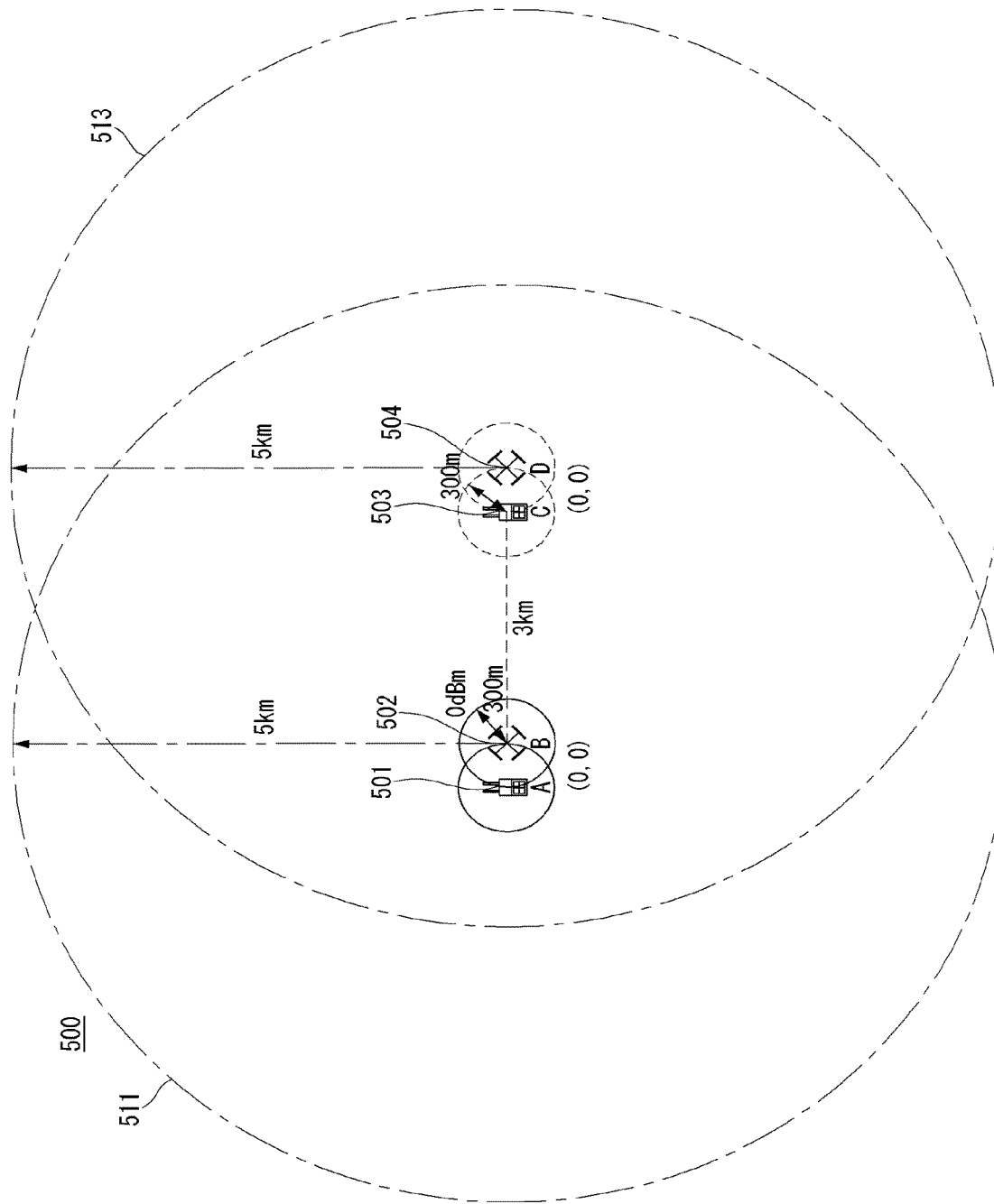

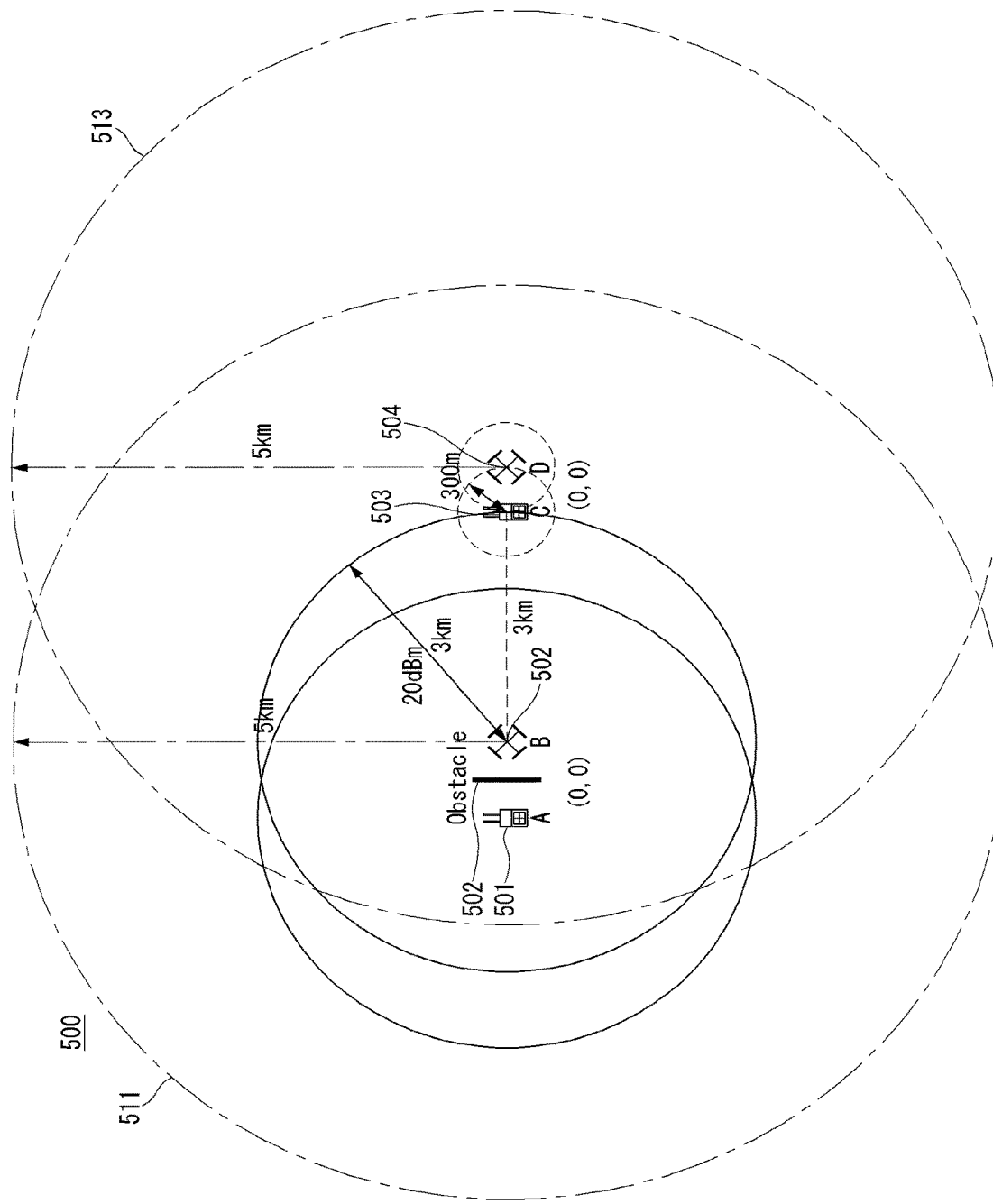

METHOD AND APPARATUS FOR CHANNEL RESOURCE MANAGEMENT IN WIRELESS COMMUNICATION SYSTEM

CROSS-REFERENCE TO RELATED APPLICATIONS

This application claims priority to Korean Patent Applications No. 10-2020-0133800 filed on Oct. 15, 2020 and No. 10-2021-0136758 filed on Oct. 14, 2021 with the Korean Intellectual Property Office (KIPO), the entire contents of which are hereby incorporated by reference.

BACKGROUND

1. Technical Field

The present disclosure relates to channel resource management techniques in a wireless communication system, and more particularly, to techniques for terminals to efficiently manage channel resources in a synchronous wireless distributed communication system.

2. Related Art

With the development of information and communication technology, various wireless communication technologies have been developed.

Recently, as commercialization of unmanned mobile terminals including small drones is rapidly progressing, communication technologies for effectively supporting communications of the unmanned mobile terminals are required. For such the communication technology for effectively supporting communication of the unmanned mobile terminals, low latency, high reliability, and low probability of a communication resource collision between terminals may be required.

As a communication technology for supporting communications of unmanned mobile terminals, a synchronous wireless distributed communication system is being considered. In an exemplary embodiment of the synchronous wireless distributed communication system, each of a plurality of spatially distributed terminals may perform an operation for allocating a resource of a control channel or a mission data channel to itself. Here, each of the distributed terminals may perform communication with other communication nodes such as a control node, using a one-to-one channel resource constituting a multi-channel resource structure. A technology capable of alleviating problems such as channel resource collision and signal interference that may occur due to a change in locations of the distributed terminals constituting the synchronous wireless distributed communication system, a change in a channel environment, a change in a transmission power, etc. may be required.

Matters described as the prior arts are prepared to promote understanding of the background of the present disclosure, and may include matters that are not already known to those of ordinary skill in the technology domain to which exemplary embodiments of the present disclosure belong.

SUMMARY

The present disclosure relates to channel resource management techniques in a wireless communication system. Particularly, exemplary embodiments of the present disclosure are directed to providing methods and apparatuses for terminals to efficiently allocate, reallocate, or manage channel resources, thereby alleviating problems such as channel resource collision, signal interference, and the like due to a communication environmental change.

According to an exemplary embodiment of the present disclosure for achieving the above-described objective, a method for channel resource management, performed by a first communication node in a communication system, may comprise: monitoring channel information broadcast packets transmitted from other communication nodes; receiving a first broadcast packet, which is a channel information broadcast packet transmitted from a third communication node that is included in the other communication nodes and performs one-to-one communication with a second communication node included in the other communication nodes; and managing a one-to-one channel resource for one-to-one communication with a fourth communication node included in the other communication nodes based on information included in the first broadcast packet, wherein the first broadcast packet includes information on a first one-to-one channel resource allocated for one-to-one communication between the second and third communication nodes.

The channel information broadcast packet may include at least one of a location of a communication node transmitting the channel information broadcast packet, a location of a communication node performing one-to-one communication by forming a node pair with the communication node transmitting the channel information broadcast packet, a one-to-one channel resource being used for one-to-one communication of a node pair including the communication node transmitting the channel information broadcast packet, or information on a one-to-one transmission power corresponding to a transmission power used by the node pair including the communication node transmitting the channel information broadcast packet for transmission of a one-to-one communication signal.

The managing of the one-to-one channel resource may comprise: determining whether the first one-to-one channel resource included in the first broadcast channel is usable as a one-to-one channel resource for one-to-one communication with the fourth communication node; and allocating a second one-to-one channel resource corresponding to a one-to-one channel resource for one-to-one communication with the fourth communication node based on a result of the determining.

The first broadcast packet may further include location information of the second communication node and location information of the third communication node, and the determining whether the first one-to-one channel resource is usable may comprise: identifying a distance between a first node pair formed by the second and third communication nodes and a second node pair formed by the first and fourth communication nodes, based on the location information of the second communication node and the location information of the third communication node; comparing the distance between the first node pair and the second node pair with a first threshold distance; and in response to determining that the distance between the first node pair and the second node pair is less than or equal to the first threshold distance, determining that the first one-to-one channel resource is unusable as a one-to-one channel resource for one-to-one communication with the fourth communication node.

The first broadcast packet may further include location information of the second communication node and location information of the third communication node, and the determining whether the first one-to-one channel resource is usable may comprise: identifying a distance between the second and third communication nodes based on the location information of the second communication node and the location information of the third communication node; comparing the distance between the second and third communication nodes with a second threshold distance; and in response to determining that the distance between the second and third communication nodes exceeds the second threshold distance, determining that the first one-to-one channel resource is unusable as a one-to-one channel resource for one-to-one communication with the fourth communication node.

The first broadcast packet may further include information on a first one-to-one transmission power corresponding to a transmission power used by a first node pair comprising the second and third communication nodes for transmission of a one-to-one communication signal, and the determining whether the first one-to-one channel resource is usable may comprise: comparing the first one-to-one transmission power with a first threshold power; and in response to determining that the first one-to-one transmission power exceeds the first threshold power, determining that the first one-to-one channel resource is unusable as a one-to-one channel resource for one-to-one communication with the fourth communication node.

The managing of the one-to-one channel resource may comprise: allocating a second one-to-one channel resource corresponding to a one-to-one channel resource for one-to-one communication with the fourth communication node; re-monitoring channel information broadcast packets transmitted from other communication nodes; receiving a second broadcast packet, which is a channel information broadcast packet transmitted again from the third communication node; and determining whether reallocation of the second one-to-one channel resource is required based on information included in the second broadcast packet, wherein the second broadcast packet includes information on a third one-to-one channel resource used for one-to-one communication between the second and third communication nodes at a time at which the second broadcast packet is transmitted.

The second broadcast packet may further include location information of the second communication node and location information of the third communication node at the time at which the second broadcast packet is transmitted, and the determining whether reallocation of the second one-to-one channel resource is required may comprise: comparing the second one-to-one channel resource with the third one-to-one channel resource; in response to determining that the second one-to-one channel resource and the third one-to-one channel resource are same, identifying a distance between a first node pair comprising the second and third communication nodes and a second node pair comprising the first and fourth communication nodes based on the location information of the second communication node and the location information of the third communication node; comparing the distance between the first node pair and the second node pair with a first threshold distance; and in response to determining that the distance between the first node pair and the second node pair is less than or equal to the first threshold distance, determining that reallocation of the second one-to-one channel resource is required.

The second broadcast packet may further include location information of the second communication node and location information of the third communication node at the time at which the second broadcast packet is transmitted, and the determining whether reallocation of the second one-to-one channel resource is required may comprise: comparing the second one-to-one channel resource with the third one-to-one channel resource; in response to determining that the second one-to-one channel resource and the third one-to-one channel resource are same, comparing a distance between the second and third communication nodes with a second threshold distance; and in response to determining that the distance between the second and third communication nodes exceeds the second threshold distance, determining that reallocation of the second one-to-one channel resource is required.

The second broadcast packet may further include information on a second one-to-one transmission power corresponding to a transmission power used by a first node pair comprising the second and third communication nodes for transmission of a one-to-one communication signal at the time at which the second broadcast packet is transmitted, and the determining whether reallocation of the second one-to-one channel resource is required may comprise: comparing the second one-to-one channel resource with the third one-to-one channel resource; in response to determining that the second one-to-one channel resource and the third one-to-one channel resource are same, comparing the second one-to-one transmission power with a first threshold power; and in response to determining that the second one-to-one transmission power exceeds the first threshold power, determining that reallocation of the second one-to-one channel resource is required.

The second broadcast packet may further include movement path information of at least one of the second and third communication nodes.

The determining whether reallocation of the second one-to-one channel resource is required may comprise: comparing the second one-to-one channel resource with the third one-to-one channel resource; in response to determining that the second one-to-one channel resource and the third one-to-one channel resource are same, identifying the movement path information of at least one of the second and third communication nodes based on information included in the second broadcast packet; based on the movement path information of at least one of the second and third communication nodes, calculating a time at which a distance between a first node pair comprising the second and third communication nodes and a second node pair comprising the first and fourth communication nodes becomes equal to or less than a third threshold distance; and determining that reallocation of the second one-to-one channel resource is required before the time at which the distance between the first node pair and the second node pair becomes less than or equal to the third threshold distance.

The determining whether reallocation of the second one-to-one channel resource is required may comprise: comparing the second one-to-one channel resource with the third one-to-one channel resource; in response to determining that the second one-to-one channel resource and the third one-to-one channel resource have different frequency resource numbers and a same time resource number, identifying the movement path information of at least one of the second and third communication nodes based on the second broadcast packet; based on the movement path information of at least one of the second and third communication nodes, calculating a time at which a distance between a first node pair comprising the second and third communication nodes and a second node pair comprising the first and fourth communication nodes becomes equal to or less than a fourth threshold distance; and determining that reallocation of the second one-to-one channel resource is required before the time at which the distance between the first node pair and the second node pair becomes less than or equal to the fourth threshold distance.

The movement path information may include information on at least one waypoint (WP), and information on a time remaining until arriving at each of the at least one WP.

The third and fourth communication nodes may be unmanned aerial vehicles, and the first and second communication nodes may be control nodes for controlling the third and fourth communication nodes.

According to another exemplary embodiment of the present disclosure for achieving the above-described objective, a first communication node performing channel resource management in a communication system may comprise: a processor; a memory electronically communicating with the processor; and instructions stored in the memory, wherein when executed by the processor, the instructions cause the first communication node to: monitor channel information broadcast packets transmitted from other communication nodes; receive a first broadcast packet, which is a channel information broadcast packet transmitted from a third communication node that is included in the other communication nodes and performs one-to-one communication with a second communication node included in the other communication nodes; and manage a one-to-one channel resource for one-to-one communication with a fourth communication node included in the other communication nodes based on information included in the first broadcast packet, wherein the first broadcast packet includes information on a first one-to-one channel resource allocated for one-to-one communication between the second and third communication nodes.

The instructions may further cause the first communication node to: determine whether the first one-to-one channel resource included in the first broadcast channel is usable as a one-to-one channel resource for one-to-one communication with the fourth communication node; and allocate a second one-to-one channel resource corresponding to a one-to-one channel resource for one-to-one communication with the fourth communication node based on a result of the determining.

The instructions may further cause the first communication node to: allocate a second one-to-one channel resource corresponding to a one-to-one channel resource for one-to-one communication with the fourth communication node; re-monitor channel information broadcast packets transmitted from other communication nodes; receive a second broadcast packet, which is a channel information broadcast packet transmitted again from the third communication node; and determine whether reallocation of the second one-to-one channel resource is required based on information included in the second broadcast packet, wherein the second broadcast packet includes information on a third one-to-one channel resource used for one-to-one communication between the second and third communication nodes at a time at which the second broadcast packet is transmitted.

According to an exemplary embodiment of the present disclosure, terminals such as drones constituting a synchronous wireless distributed communication system may receive broadcast packets periodically transmitted from other terminals, and may manage one-to-one channel resources to be used by themselves based on one-to-one channel information included in the received broadcast packets. Thus, each of the terminals may select and allocate a one-to-one channel resource having little effect of collision or interference with a one-to-one channel already in use by another terminal from among one-to-one channel resources constituting a multi-channel resource structure. Each of the terminals may select and allocate a resource robust to a change in a communication environment from among the one-to-one channel resources constituting the multi-channel resource structure. Each of the terminals may perform reallocation of a one-to-one channel resource when identifying collision or interference with a one-to-one channel resource being used. Accordingly, communication efficiency of the synchronous wireless distributed communication system can be improved.

BRIEF DESCRIPTION OF DRAWINGS

FIGS. 5A to 5E are conceptual diagrams for describing a second exemplary embodiment of a channel resource management method in a communication system.

DETAILED DESCRIPTION OF THE EMBODIMENTS

Figure 1:
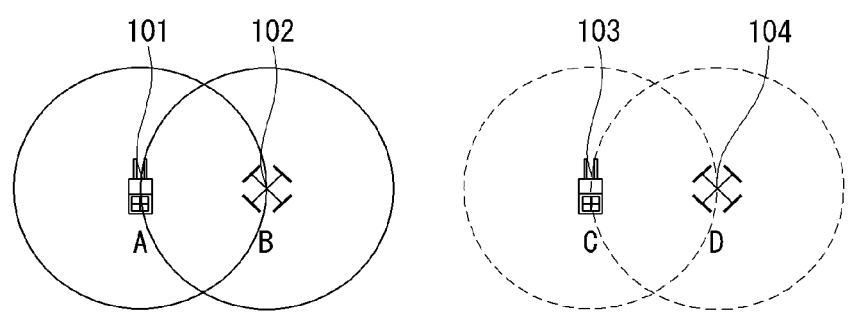
FIG. 1 is a conceptual diagram illustrating an exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a terminal may refer to a mobile station, mobile terminal, subscriber station, portable subscriber station, user equipment, an access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may include a plurality of communication nodes 101, 102, 103, and 104. The plurality of communication nodes 101, 102, 103, and 104 may perform communication with other communication entities of the communication system 100.

Each of the plurality of communication nodes may have the following structure.

Figure 2:
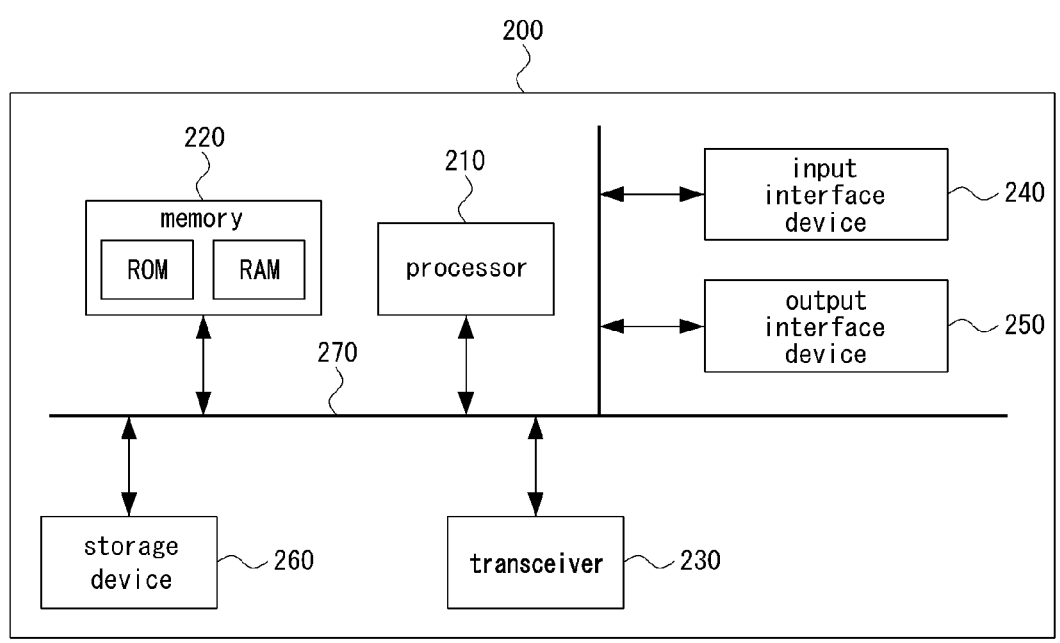
FIG. 2 is a block diagram illustrating an exemplary embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 for performing communications with other communication nodes. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, each of the plurality of communication nodes 101, 102, 103, and 104 may correspond to a terminal. The plurality of terminals 101, 102, 103, and 104 may be referred to as a first terminal 101, a second terminal 102, a third terminal 103, and a fourth terminal 104, respectively. The first terminal 101, the second terminal 102, the third terminal 103, and the fourth terminal 104 may be referred also to as a terminal A, a terminal B, a terminal C, a terminal D, respectively.

Each of the plurality of terminals 101, 102, 103, and 104 may be referred to as a user equipment (UE), a terminal, an access terminal, a mobile terminal, a station, and a subscriber station, a mobile station, a portable subscriber station, a node, a device, an Internet of Things (IoT) device, a mounted module/device/terminal or, an on-board device/terminal, and/or the like.

The plurality of terminals 101, 102, 103, and 104 may support device-to-device (D2D) communication. The plurality of terminals 101, 102, 103, and 104 may perform direct communication with each other based on the D2D communication scheme. For example, the first terminal 101 and the second terminal 102 may perform direct communication with each other. The third terminal 103 and the fourth terminal 104 may perform direct communication with each other.

The plurality of terminals 101, 102, 103, and 104 may include one or more distributed terminals and one or more control nodes. Each of the one or more distributed terminals may correspond to an unmanned aerial vehicle (UAV), unmanned mobile terminal, drone, or the like. The one or more control nodes may correspond to a controller, control terminal, manipulator, manipulation terminal, or the like, which performs control on one or more distributed terminals or receive data transmitted from one or more distributed terminals. Each distributed terminal may be paired with a specific control node to perform one-to-one communication.

For example, the second terminal 102 and the fourth terminal 104 among the plurality of terminals 101, 102, 103, and 104 may correspond to distributed terminals. Among the plurality of terminals 101, 102, 103, and 104, the first terminal 101 and the third terminal 103 may correspond to control nodes for controlling distributed terminals. The second terminal 102 as a distributed terminal may be paired with the first terminal 101 as a control node, and may operate based on control of the first terminal 101. The fourth terminal 104 as a distributed terminal may be paired with the third terminal 103 as a control node, and may operate based on control of the third terminal 103.

Hereinafter, channel resource management methods in a wireless communication system will be described. Here, even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a receiving node is described, a corresponding transmitting node may perform an operation corresponding to the operation of the receiving node. Conversely, when an operation of the transmitting node is described, the corresponding receiving node may perform an operation corresponding to the operation of the transmitting node.

Figure 3A:
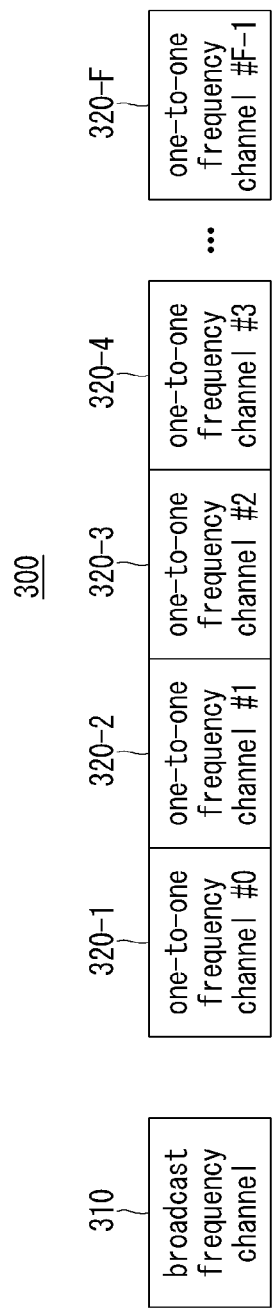
FIGS. 3A to 3D are conceptual diagrams for describing an exemplary embodiment of a multi-channel structure and a multi-channel resource structure in a communication system.
Figure 3B:
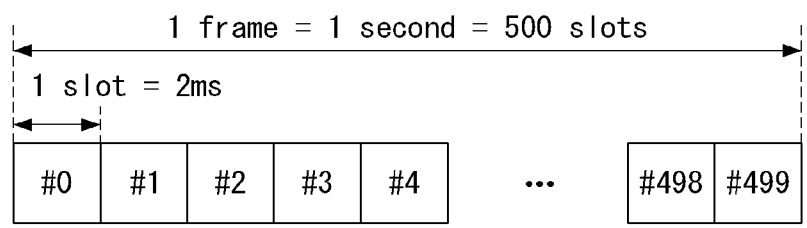
Figure 3C:
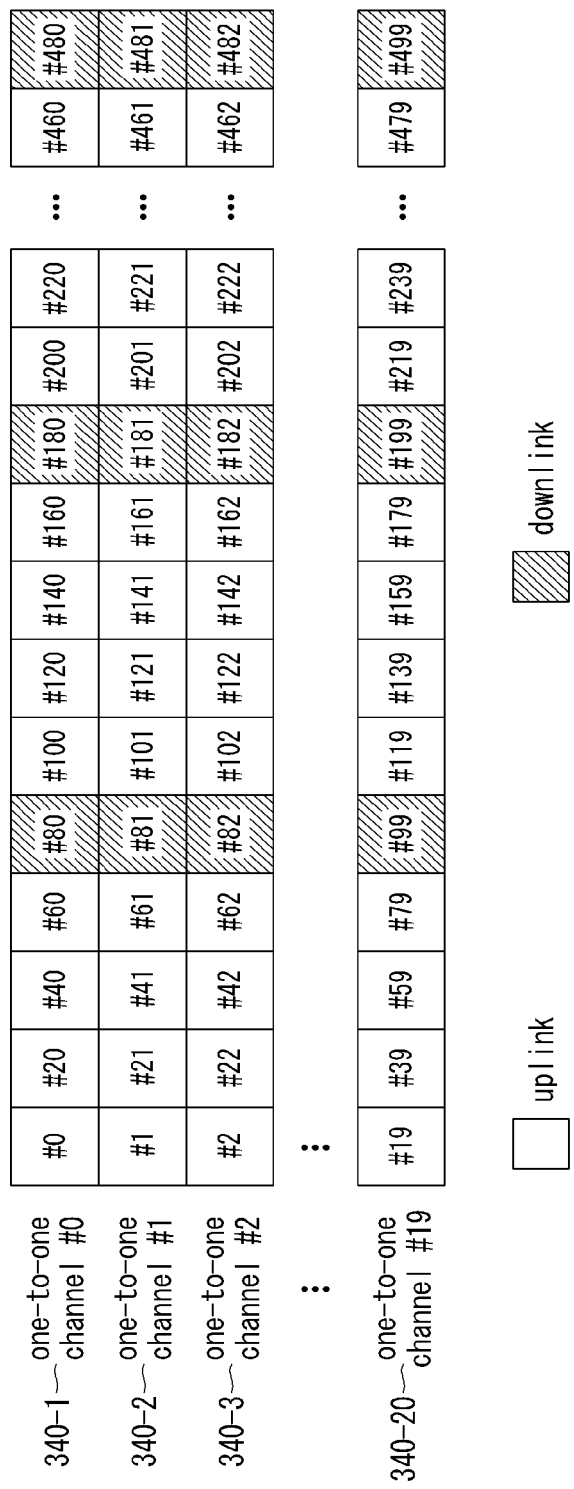

FIGS. 3A to 3C are conceptual diagrams for describing an exemplary embodiment of a multi-channel structure and a multi-channel resource structure in a communication system.

Referring to FIGS. 3A to 3C, a communication system 300 may be a time division multiple access (TDMA)-based synchronous wireless distributed communication system. The synchronous wireless distributed communication system may be characterized in that there is no central control node such as a base station performing central control, and a plurality of terminals or all terminals are mutually synchronized. A plurality of communication nodes constituting the communication system 300 may perform communications based on a multi-channel structure composed of at least one broadcast frequency channel 310 and at least one one-to-one frequency channel 320-1, 320-2, 320-3, 320-4, . . . , and 320-F. Here, each of the frequency channels 310, 320-1, 320-2, 320-3, 320-4, . . . , and 320-F may have a different center frequency. The communication nodes constituting the communication system 300 may include one or more distributed terminals and one or more control nodes. Each of the one or more distributed terminals may correspond to an unmanned mobile terminal, drone, or the like. Each of the one or more control nodes may correspond to a controller, control terminal, manipulator, manipulation terminal, or the like that performs control on one or more distributed terminals or receive data transmitted from one or more distributed terminals. Here, a signal transmitted from a control node to a distributed terminal may be referred to as a downlink signal. On the other hand, a signal transmitted from a distributed terminal to a control node may be referred to as an uplink signal.

FIG. 3A shows an exemplary embodiment of a multi-channel structure including one broadcast frequency channel and a plurality of one-to-one frequency channels in the communication system 300. Referring to FIG. 3A, the number of one-to-one frequency channels may be a natural number F. The one-to-one frequency channels may be referred to as a one-to-one frequency channel #0 320-1, one-to-one frequency channel #1 320-2, one-to-one frequency channel #2 320-3, one-to-one frequency channel #3 320-4, . . . , and one-to-one frequency channel #F−1 320-F, respectively. For example, in an exemplary embodiment of the communication system 300, the number of one-to-one frequency channels 320-1, 320-2, 320-3, 320-4, . . . , and 320-F may be 25, and the multi-channel structure may include the broadcast frequency channel 310, one-to-one frequency channel #0 320-1, one-to-one frequency channel #1 320-2, one-to-one frequency channel #2 320-3, one-to-one frequency channel #3 320-4, . . . , and one-to-one frequency channel #24 320-25. Each of the frequency channels 310, 320-1, 320-2, 320-3, 320-4, . . . , and 320-F may be used as a control channel or a mission data channel Each of the frequency channels 310, 320-1, 320-2, 320-3, 320-4, . . . , and 320-F may have the same or different bandwidth. For example, the broadcast frequency channel 310 may have a bandwidth of 0.25 MHz, and each of the one-to-one frequency channels 320-1, 320-2, 320-3, 320-4, . . . , and 320-F may have a bandwidth of 1 MHz. The exemplary embodiment described with reference to FIG. 3A is merely an example for convenience of description, and exemplary embodiments of the present disclosure are not limited thereto, and the operating bandwidth of the communication system 300 and/or communication nodes constituting the communication system 300 may be determined differently depending on the number of communication nodes constituting the communication system 300, or the like.

FIG. 3B shows an exemplary embodiment of a structure of each frequency channel in the communication system 300. Referring to FIG. 3B, in the communication system 300, one frequency channel 330 may be configured with a plurality of slots separated in the time domain. Here, the frequency channel 330 may be the broadcast frequency channel described with reference to FIG. 3A or the one-to-one frequency channel FIG. 3B shows an exemplary embodiment of a one-to-one frequency channel 340 configured to include 500 slots per frame. Assuming 1 second per frame, each slot may have a length of 2 ms. However, this is only an example for convenience of description, and exemplary embodiments of the present disclosure are not limited thereto.

FIG. 3C shows an exemplary embodiment of a structure of each one-to-one frequency channel in the communication system 300. Referring to FIG. 3C, a one-to-one frequency channel 340 may be composed of a plurality of one-to-one channels or one-to-one communication channels separated in the time domain. Here, the one-to-one frequency channel 340 may correspond to any one of the one-to-one frequency channels 320-1, 320-2, 320-3, 320-4, . . . , and 320-F described with reference to FIG. 3A.

The one-to-one frequency channel 340 may be composed of a plurality of slots separated in the time domain. The plurality of slots may be grouped to configure a plurality of slot groups. Each slot group may be referred to as a 'one-to-one channel'. Each one-to-one channel may be referred to as a 'subchannel'. One one-to-one channel may be configured as one communication resource unit. FIG. 3C shows an exemplary embodiment of the one-to-one frequency channel 340 configured to include 500 slots per frame. Here, each one-to-one channel may be composed of 25 slots. The one-to-one frequency channel 340 may be composed of 20 one-to-one channels 340-1, 340-2, 340-3, . . . , and 340-20. The one-to-one frequency channel 340 may include the one-to-one channel #0 340-1, one-to-one channel #1 340-2, one-to-one channel #2 340-3, . . . , and one-to-one channel #19 340-20. The 25 slots constituting each of the one-to-one channels 340-1, 340-2, 340-3, . . . , and 340-20 may include one or more uplink slots and one or more downlink slots. The one-to-one channels 340-1, 340-2, 340-3, . . . , and 340-20 may be arranged in order in the time domain.

In an exemplary embodiment of the communication system 300, one-fifth of the 25 slots constituting each of the one-to-one channels 340-1, 340-2, 340-3, . . . , and 340-20 may be configured as downlink channels. In other words, 5 slots among 25 slots constituting each of the one-to-one channels 340-1, 340-2, 340-3, . . . , and 340-20 may be downlink slots, and the remaining 20 slots may be uplink slots. For example, among the 25 slots constituting the one-to-one channel 340-1, slots #80, #180, #280, #380, and #480 may correspond to downlink slots. The downlink slot may be used for transmission/reception of a downlink signal transmitted from a control node constituting the communication system 300 to a distributed terminal. The uplink slot may be used for transmission/reception of an uplink signal transmitted from the distributed terminal to the control node. The uplink slots and the downlink slots may be completely separated in the time domain. A signal interference may not occur between the uplink slots and the downlink slots. The exemplary embodiment described with reference to FIG. 3C is merely an example for convenience of description, and exemplary embodiments of the present disclosure are not limited thereto.

Figure 3D:
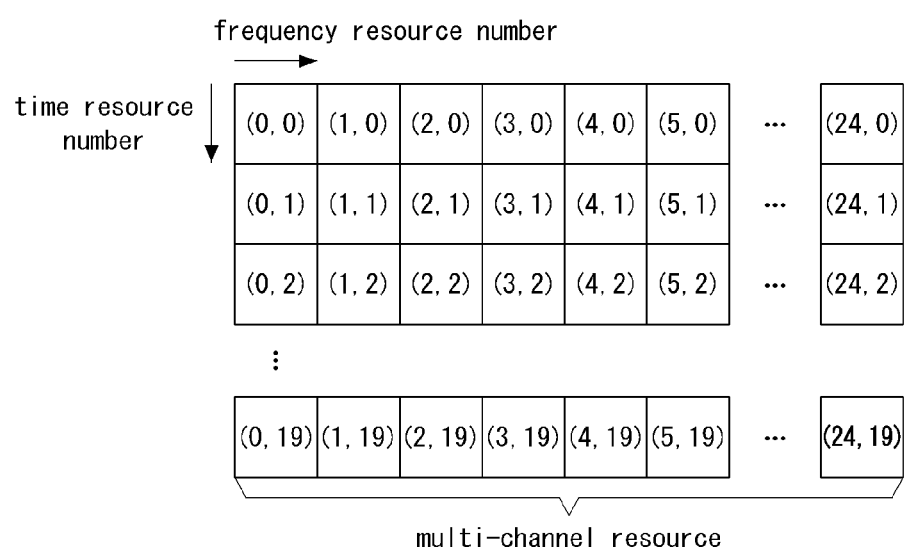

FIG. 3D shows an exemplary embodiment of a multi-channel structure used for one-to-one communication between communication nodes in the communication system 300. Referring to FIG. 3D, one-to-one communication between communication nodes in the communication system 300 may be performed based on the F one-to-one frequency channels described with reference to FIG. 3A. The one-to-one frequency channels may be expressed as the one-to-one frequency channel #0, one-to-one frequency channel #1, one-to-one frequency channel #2, one-to-one frequency channel #3, . . . , and one-to-one frequency channel #F−1. Each of the one-to-one frequency channels may be composed of a plurality of one-to-one channels described with reference to FIG. 3C. Each of the one-to-one frequency channels may be composed of 20 one-to-one channels. Each of the one-to-one channels may be expressed as the one-to-one channel #0, one-to-one channel #1, one-to-one channel #2, . . . , and one-to-one channel #19.

Each of the one-to-one channels may correspond to a slot group and may be configured as one communication resource unit. In an exemplary embodiment of the communication system 300, a plurality of communication resources constituting the multi-channel resource group may be expressed based on identifiers of the F one-to-one frequency channels and 20 one-to-one channels constituting each one-to-one frequency channel. For example, each of the communication resources constituting the multi-channel resource group may be indicated as (f,s). Here, f is a frequency resource number, and may correspond to an identifier of a one-to-one frequency channel having a value ranging from 0 to F−1. On the other hand, s is a time resource number, and may correspond to an identifier of a one-to-one channel (i.e., slot group) having a value ranging from 0 to 19. Accordingly, the communication resource (f,s) may indicate a one-to-one channel #s among one-to-one channels constituting a one-to-one frequency channel #f. The communication system 300 may support communications of as many distributed terminals as the number of communication resources constituting the multi-channel resource group. For example, each of the one-to-one frequency channels may support communications of 20 distributed terminals, and thus, F one-to-one frequency channels may theoretically support communications of up to F×20 distributed terminals.

Figure 4A:
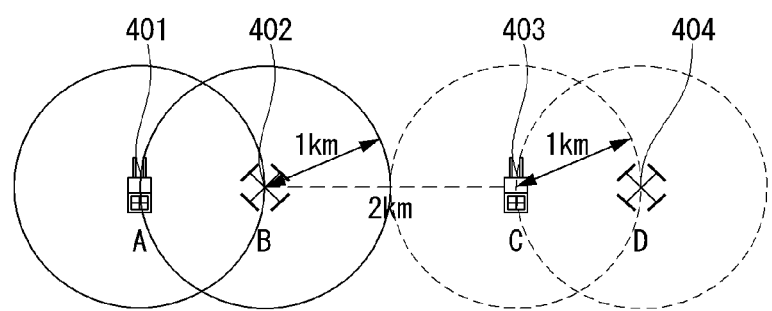
FIGS. 4A and 4B are conceptual diagrams for describing a first exemplary embodiment of a channel resource management method in a communication system.
Figure 4B:
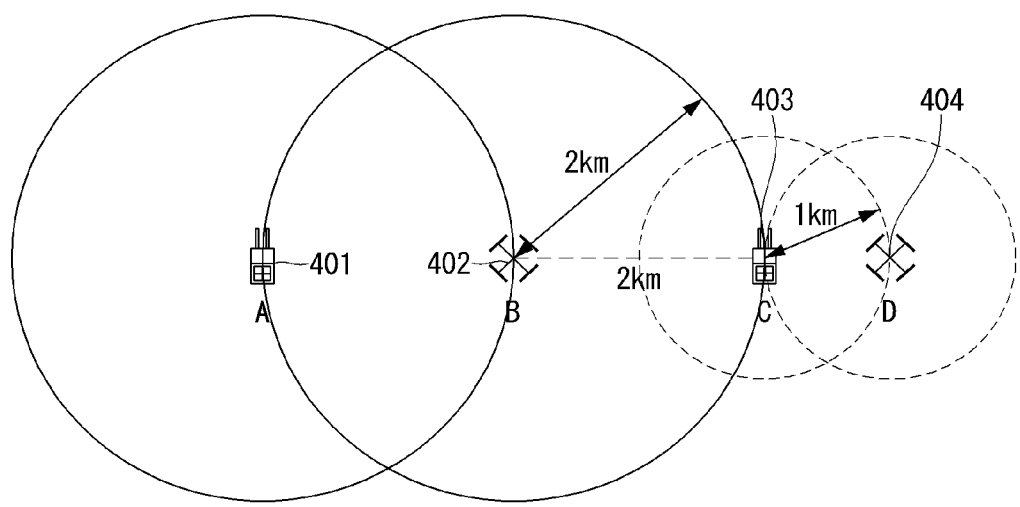

FIGS. 4A and 4B are conceptual diagrams for describing a first exemplary embodiment of a channel resource management method in a communication system.

Referring to FIGS. 4A and 4B, a communication system 400 may be a TDMA-based synchronous wireless distributed communication system. The communication system 400 may be the same as or similar to the communication system 300 described with reference to FIGS. 3A to 3C. Communication nodes constituting the communication system 400 may include one or more distributed terminals and one or more control nodes. Each of the one or more distributed terminals may correspond to an unmanned mobile terminal, drone, or the like. Each of the one or more control nodes may correspond to a controller, control terminal, manipulator, manipulation terminal, or the like that performs control on one or more distributed terminals or receive data transmitted from one or more distributed terminals. Each distributed terminal may be paired with a specific control node to perform one-to-one communication. Two communication nodes paired with each other may communicate with each other through the one-to-one channel or the one-to-one channel resource described with reference to FIGS. 3A to 3C. Each communication node may adjust a transmission power for one-to-one communication based on a mutual distance and/or a channel state with another communication node that is paired with itself. Each communication node may manage a one-to-one channel resource for one-to-one communication with another communication node that is paired with itself based on signals received from other communication nodes that are not paired with itself.

FIGS. 4A and 4B show an exemplary embodiment in which terminals A and B 401 and 402 included in the communication system 400 form a pair to perform one-to-one communication, and terminals C and D 403 and 404 form a pair to perform one-to-one communication. Here, the pair of the terminals A and B may be referred to as a 'A-B terminal pair', and the pair of the terminals C and D may be referred to as a 'C-D terminal pair'. The terminals A and C may correspond to control nodes, and the terminals B and D 402 may correspond to distributed terminals. However, this is only an example for convenience of description, and exemplary embodiments of the present disclosure are not limited thereto.

In the present disclosure, a configuration expressed as an 'operation of a terminal pair' may refer to an operation performed by any one of two terminals constituting the corresponding terminal pair. Alternatively, a configuration expressed as an 'operation of a terminal pair' may refer to a procedure performed by signal transmission/reception between two terminals constituting the corresponding terminal pair. For example, an 'operation of the A-B terminal pair' may refer to an operation performed by the terminal A or the terminal B. Alternatively, an 'operation of the A-B terminal pair' may refer to an operation performed by the terminal A and the terminal B 402. Alternatively, an 'operation of the A-B terminal pair' may refer to a procedure performed by signal transmission/reception between the terminal A and the terminal B.

In the present disclosure, a 'distance between two terminal pairs' may mean the closest distance among distances between terminals constituting the two terminal pairs. For example, a distance between the A-B terminal pair and the C-D terminal pair may be the closest distance among a distance between the terminal A and the terminal C, a distance between the terminal A and the terminal D, a distance between the terminal B and the terminal C, and a distance between the terminal B and the terminal D.

Referring to FIG. 4A, in an exemplary embodiment of the communication system 400, a mutual distance of the A-B terminal pair may be 1 km, a mutual distance of the C-D terminal pair may be 1 km, and a mutual distance of the terminals B and C may be 2 km. Each of the terminals A and B may control a transmission power so that a communication radius of one-to-one communication becomes 1 km. When the mutual distance of the C-D terminal pair is 1 km, each of the terminals C and D may control the transmission power so that the communication radius of the one-to-one communication becomes 1 km. In this case, a one-to-one communication signal transmitted and received in the A-B terminal pair may not cause interference or collision in the C-D terminal pair. In addition, a one-to-one communication signal transmitted and received in the C-D terminal pair may not cause interference or collision in the A-B terminal pair.

Referring to FIG. 4B, the mutual distance of the C-D terminal pair may be maintained as 1 km, but if the mutual distance of the terminal A-B pair becomes 2 km, each of the terminals A and B may control a transmission power so that the communication radius of one-to-one communication becomes 2 km or more. In this case, a one-to-one communication signal transmitted and received in the C-D terminal pair still may not cause interference or collision in the A-B terminal pair. However, as the terminal C is positioned within the communication radius of the terminal B, a one-to-one communication signal transmitted by the terminal B to the terminal A may cause interference or collision in a one-to-one communication signal transmitted and received by the terminal C. In this case, the one-to-one communication of the C-D terminal pair may not be smooth. When the one-to-one communication of the C-D terminal pair is not smooth, it may not be easy for the terminal C as a control node to control the terminal D as a distributed terminal. In other words, when the one-to-one communication of the C-D terminal pair is not smooth, a control link of the C-D terminal pair may be lost. When the control link of the C-D terminal pair is lost, the terminals C and D may perform an operation for recovering the control link. For example, the terminals C and D may try to avoid interference or collision from the A-B terminal pair by changing a one-to-one channel resource used for the one-to-one communication.

However, in case of using the scheme of recovering a control link after the control link is lost, a problem may occur due to a time interval between a time at which the control link is lost and a time at which the control link is recovered. For example, the terminal D may be a drone or unmanned mobile terminal that moves under the control of the terminal C. If the control link of the C-D terminal pair is lost, the terminal D may not be controlled by the terminal C until the control link is recovered. The terminal D, which does not receive the control of the terminal C, may not operate normally, and may cause danger to itself or its surroundings. In addition, in case of using the scheme of recovering a control link after the control link is lost, a terminal pair for which a control link is not lost may not recognize whether a problem situation has occurred or is likely to occur. Accordingly, even if the problem is solved in the terminal pair for which the control link is lost, an additional problem may be caused. That is, methods for allowing neighbor terminal pairs to recognize a possibility of the problem situation in advance and to avoid interference or collision before loss of the control link may be required.

In order to alleviate problems such as interference or collision between neighbor terminal pairs, a scheme of limiting a change in a transmission power of each terminal may be used. A change in a transmission power of each terminal may cause a sudden change in a communication channel environment, and if a change in a transmission power of each terminal is limited, the problem of interference or collision between neighbor terminal pairs may be alleviated. However, as in the situation shown in FIG. 4B, when a channel condition becomes poor due to the increasing distance between terminals constituting some terminal pairs, an operation of increasing a transmission power to secure sufficient communication quality may be required. Therefore, although it is possible to limit a rate of change of a transmission power of each terminal, it may not be appropriate to limit a range of change of the transmission power.

FIGS. 5A to 5E are conceptual diagrams for describing a second exemplary embodiment of a channel resource management method in a communication system.

Referring to FIGS. 5A to 5E, a communication system 500 may be a TDMA-based synchronous wireless distributed communication system. The communication system 500 may be the same as or similar to the communication system 400 described with reference to FIGS. 4A and 4B. Communication nodes constituting the communication system 500 may include one or more distributed terminals and one or more control nodes. The communication system 500 may include terminals A and B 501 and 502 that are paired with each other and perform mutual one-to-one communication, and terminals C and D 503 and 504 that are paired with each other and perform mutual one-to-one communication. Here, the terminals A to D may be the same as or similar to the terminals A to D described with reference to FIGS. 4A and 4B. Each terminal pair may perform one-to-one communication based on a one-to-one channel resource (f,s) identical or similar to that described with reference to FIG. 3D. Hereinafter, in describing the second exemplary embodiment of the channel resource management method in a communication system with reference to FIGS. 5A to 5E, content overlapping with those described with reference to FIGS. 3A to 4B may be omitted.

As described with reference to FIG. 4B, the C-D terminal pair performing one-to-one communication in the communication system 500 may experience interference or collision due to a one-to-one communication signal transmitted from the neighbor A-B terminal pair. Similarly, the A-B terminal pair may experience interference or collision due to a one-to-one communication signal transmitted from the neighbor C-D terminal pair. The terminals A to D of the communication system 500 may perform operations to avoid interference or collision between neighbor terminal pairs.

In an exemplary embodiment of the communication system 500, at least one of the terminals constituting the A-B terminal pair may periodically transmit a broadcast packet through a broadcast frequency channel. At least one of the terminals constituting the C-D terminal pair may periodically transmit a broadcast packet through the broadcast frequency channel Here, the broadcast packet transmitted periodically may include information on a one-to-one channel resource allocated for one-to-one communication of each terminal pair.

For example, the terminal B corresponding to a distributed terminal among the terminals constituting the A-B terminal pair and the terminal D corresponding to a distributed terminal among the terminals constituting the C-D terminal pair may periodically transmit a broadcast packet including channel information or one-to-one channel resource information through the broadcast frequency channel Here, the broadcast packet including channel information or one-to-one channel resource information may be referred to as a 'channel information broadcast packet'. The channel information broadcast packet may be used for managing a one to-one channel resource. The channel information broadcast packet may be referred to as a 'channel resource management broadcast packet'. The broadcast frequency channel through which the channel resource management broadcast packet is periodically transmitted may be the same as or similar to the broadcast frequency channel described with reference to FIGS. 3A and 3B. Each of the terminals B and D may periodically transmit the channel resource management broadcast packet by including its own location information, location information of a control terminal performing one-to-one communication with itself, information of a one-to-one channel resource allocated for one-to-one communication, information on a transmission power set for transmission of a one-to-one communication signal, and/or the like in the channel resource management broadcast packet. The channel resource management broadcast packet may be transmitted with a greater transmission power than that of a one-to-one communication signal for one-to-one communication of each terminal pair. In other words, a communication distance of the channel resource management broadcast packet may have a larger value than a communication distance for one-to-one communication of each terminal pair. The communication distance of the channel resource management broadcast packet may have a value greater than twice the communication distance for one-to-one communication of each terminal pair.

For example, referring to FIG. 5A, in an exemplary embodiment of the communication system 500, the communication distance for one-to-one communication of the A-B terminal pair may be 1 km, the communication distance for the one-to-one communication of the C-D terminal pair may be 1 km, and the communication distance of the channel resource management broadcast packet may be 5 km. Accordingly, each terminal pair may receive the channel resource management broadcast packet transmitted from a neighbor terminal pair in advance as compared to a one-to-one communication signal transmitted from the neighbor terminal pair, and may recognize a possibility of a problem situation in advance. However, this is only an example for convenience of description, and exemplary embodiments of the present disclosure are not limited thereto.

The A-B terminal pair may perform one-to-one communication based on a predetermined one-to-one channel resource. For example, the A-B terminal pair may perform one-to-one communication based on a one-to-one channel resource (0,0). The terminal B may periodically transmit the channel resource management broadcast packet including a location of the terminal B itself, a location of the terminal A, information of the one-to-one channel resource (0,0) allocated for one-to-one communication of the A-B terminal pair, a transmission power of a one-to-one communication signal transmitted by the terminal A, and/or the like.

The C-D terminal pair may identify usable resources before performing one-to-one channel resource allocation for one-to-one communication. For example, in an exemplary embodiment of the communication system 500, one-to-one channel resources usable by the C-D terminal pair may be one-to-one channel resources (0,0), (1,3), (2,14), (3,5), (3,7), and the like. In this case, if the C-D terminal pair allocates (0,0) as a one-to-one channel resource for one-to-one communication, the A-B terminal pair and the C-D terminal pair may use the same one-to-one channel resource. In this case, when the distance between the A-B terminal pair and the C-D terminal pair gets closer or the transmission power of either side increases, a mutual collision may occur.

Figure 5B:
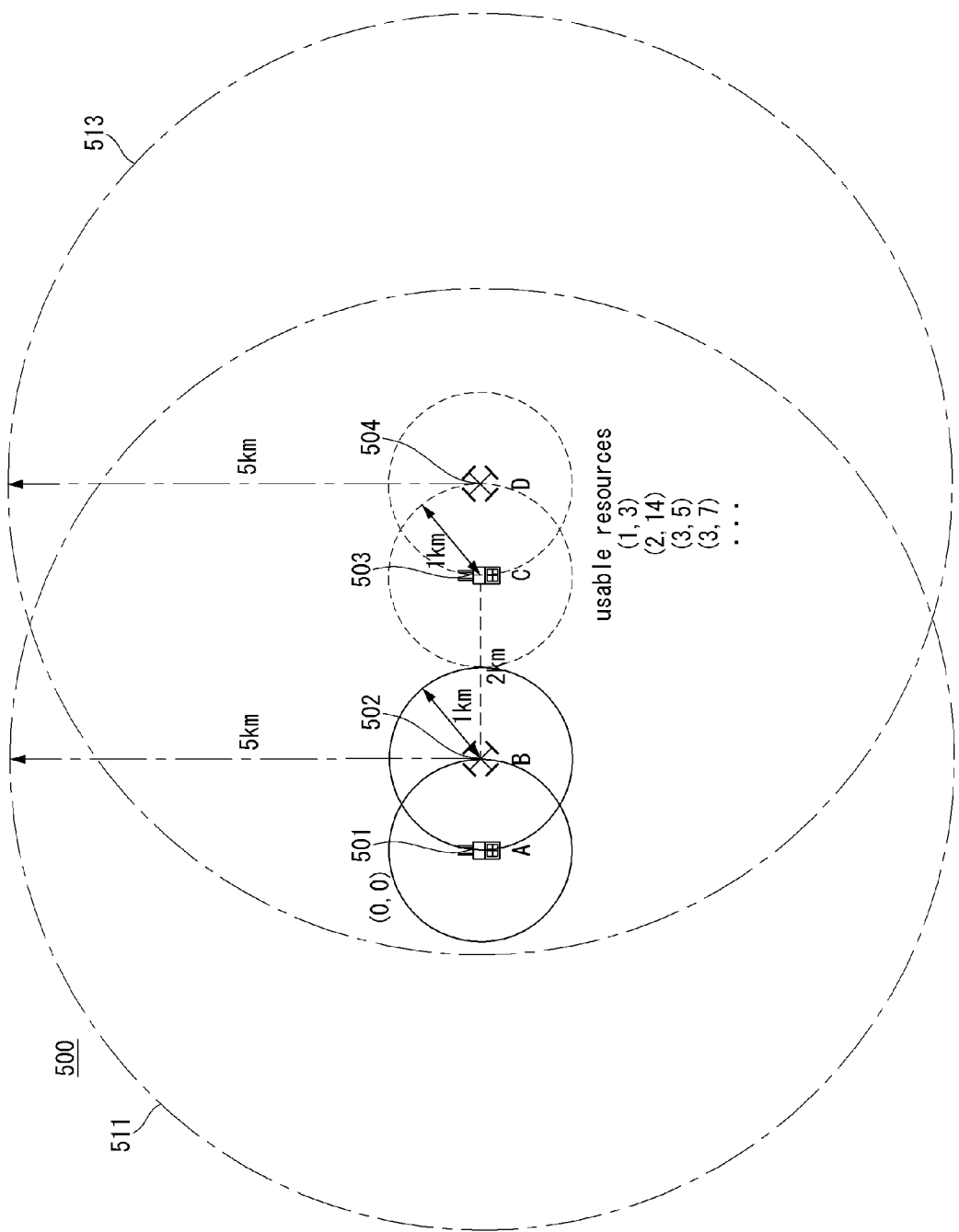

On the other hand, referring to FIG. 5B, the C-D terminal pair may identify usable resources before performing one-to-one channel resource allocation for one-to-one communication. Here, the C-D terminal pair may identify the contents of the channel resource management broadcast packet transmitted from the terminal B, and perform one-to-one channel resource allocation based on the information included in the channel resource management broadcast packet. For example, the C-D terminal pair may identify that the neighbor A-B terminal pair has allocated the one-to-one channel resource (0,0) for one-to-one communication, based on the information included in the channel resource management broadcast packet. The C-D terminal pair may exclude the one-to-one channel resource (0,0) allocated for one-to-one communication of the neighbor A-B terminal pair from the usable resources. The C-D terminal pair may allocate any one one-to-one channel resource among the remaining usable resources (i.e., one-to-one channel resources (1,3), (2,14), (3,5), (3,7), etc.) to perform one-to-one communication.

That is, when the terminal pair selects a one-to-one channel resource for one-to-one communication among usable resources, based on the information included in the channel resource management broadcast packet transmitted from other neighbor terminal pair(s), one-to-one channel resource(s) already used by other neighbor terminal pair(s) may be excluded.

On the other hand, if a distance between the neighbor terminal pairs has a value significantly larger than a communication distance for one-to-one communication of each terminal pair, a possibility of interference or collision may be low even when the neighbor terminal pairs use the same one-to-one channel resource. In this case, when each terminal pair unconditionally excludes a one-to-one channel resource identified to be used by a neighbor terminal pair, communication efficiency may be unnecessarily degraded.

For example, in an exemplary embodiment shown in FIG. 5C, a communication distance of each of the A-B terminal pair and the C-D terminal pair may be 300 m, and a distance between the A-B terminal pair and the C-D terminal pair may be 3 km. In this case, even if the A-B terminal pair and the C-D terminal pair use the same one-to-one channel resource, a possibility of interference or collision may be low. In this case, when the C-D terminal pair allocates a one-to-one channel resource for one-to-one communication, the C-D terminal pair may identify the distance between the A-B terminal pair and the C-D terminal pair based on the location information of the terminals A and B included in the channel resource management broadcast packet transmitted from the A-B terminal pair. The C-D terminal pair may compare the distance between the A-B terminal pair and the C-D terminal pair with a predetermined first threshold distance. If the distance between the A-B terminal pair and the C-D terminal pair is less than or equal to the first threshold distance, the C-D terminal pair may exclude the one-to-one channel resource being used by the A-B terminal pair from among the usable resources and may select any one of the remaining usable resources. On the other hand, if the distance between the A-B terminal pair and the C-D terminal pair has a value greater than the first threshold distance, the C-D terminal pair may perform one-to-one channel resource allocation for one-to-one communication of the C-D terminal pair regardless of the information on the one-to-one channel resource being used by the A-B terminal pair. For example, when the first threshold distance is set to 2.5 km, since the distance 3 km between the A-B terminal pair and the C-D terminal pair has a value greater than the first threshold distance of 2.5 km, the C-D terminal pair may perform one-to-one channel resource allocation for one-to-one communication of the C-D terminal pair regardless of the information on the one-to-one channel resource being used by the A-B terminal pair. In other words, the C-D terminal pair may perform one-to-one channel resource allocation without excluding the one-to-one channel resource (0,0) being used by the A-B terminal pair from among the usable resources. Here, the first threshold distance may be determined based on a one-to-one communication signal transmission power or a one-to-one communication distance of each of the terminals.

On the other hand, in determining a possibility of occurrence of a problem between neighbor terminal pairs, if the determination is performed based only on location information of terminals constituting the neighbor terminal pairs, factors affecting a channel state other than the location and distance may not be properly reflected. Accordingly, unexpected problems may occur.

For example, in an exemplary embodiment shown in FIG. 5D, the distances between the terminals may be the same or similar to those of the exemplary embodiment shown in FIG. 5C. The communication distance of each of the A-B terminal pair and the C-D terminal pair may be 300 m, and the distance between the A-B terminal pair and the C-D terminal pair may be 3 km. Here, an obstacle 520 may exist between the terminal A and the terminal B constituting the A-B terminal pair. Due to the existence of the obstacle 520, a channel condition between the terminal A and the terminal B may be significantly degraded compared to a situation in which the obstacle 520 does not exist. The A-B terminal pair may increase the transmission power of the one-to-one communication signal in order to overcome the situation in which the channel condition is deteriorated due to the presence of the obstacle 520. Due to the increase in the transmission power of the one-to-one communication signal, the communication distance for the one-to-one communication of the A-B terminal pair may be increased to 3 km or more. In this case, despite the fact that the physical distance between the terminals A and B constituting the A-B terminal pair is relatively close compared to the distance between the A-B terminal pair and the C-D terminal pair, a one-to-one communication signal for the one-to-one communication of the A-B terminal pair may reach the C-D terminal pair. If the C-D terminal pair uses the same one-to-one channel resource (0,0) as the A-B terminal pair, a problem such as interference or collision may occur in the one-to-one communication of the C-D terminal pair due to a one-to-one communication signal transmitted from the terminal B. That is, in the same or similar situation as shown in FIG. 5D, the C-D terminal pair may need to perform one-to-one channel resource allocation by excluding the one-to-one channel resource (0,0) being used by the A-B terminal pair among usable resources.

When the C-D terminal pair allocates a one-to-one channel resource for one-to-one communication, information on a transmission power (i.e., one-to-one transmission power) of a one-to-one communication signal included in the channel resource management broadcast packet transmitted from the A-B terminal pair may be identified. The C-D terminal pair may compare the identified one-to-one transmission power of the A-B terminal pair with a predetermined threshold power. If the one-to-one transmission power of the A-B terminal pair exceeds the predetermined threshold power, the C-D terminal pair may exclude the one-to-one channel resource being used by the A-B terminal pair from among the usable resources, and select any one of the remaining usable resources. On the other hand, if the one-to-one transmission power of the A-B terminal pair is less than or equal to the predetermined threshold power, the C-D terminal pair may perform one-to-one channel resource allocation for one-to-one communication of the C-D terminal pair regardless of the information on the one-to-one channel resource being used by the A-B terminal pair.

For example, when the one-to-one transmission power of the A-B terminal pair is 20 dBm and the predetermined threshold power is set to 10 dbm as in the exemplary embodiment shown in FIG. 5D, the C-D terminal pair may determine that the one-to-one transmission power of the A-B terminal pair exceeds the threshold power. In this case, the C-D terminal pair may perform one-to-one channel resource allocation based on the remaining resources excluding the one-to-one channel resource being used by the A-B terminal pair. In other words, the C-D terminal pair may perform one-to-one channel resource allocation by excluding the one-to-one channel resource (0,0) being used by the A-B terminal pair from among the usable resources. On the other hand, when the one-to-one transmission power of the A-B terminal pair is 0 dBm and the predetermined threshold power is set to 10 dBm as in the exemplary embodiment shown in FIG. 5C, the C-D terminal pair may determine that the one-to-one transmission power of the A-B terminal pair is less than or equal to the threshold power. In this case, the C-D terminal pair may perform one-to-one channel resource allocation for one-to-one communication of the C-D terminal pair regardless of the information on the one-to-one channel resource being used by the A-B terminal pair. In other words, the C-D terminal pair may perform one-to-one channel resource allocation without excluding the one-to-one channel resource (0,0) being used by the A-B terminal pair from among the usable resources. Here, the threshold power may be determined based on the distance between the terminal pairs or the one-to-one communication distance of each of the terminals.

Figure 5E:
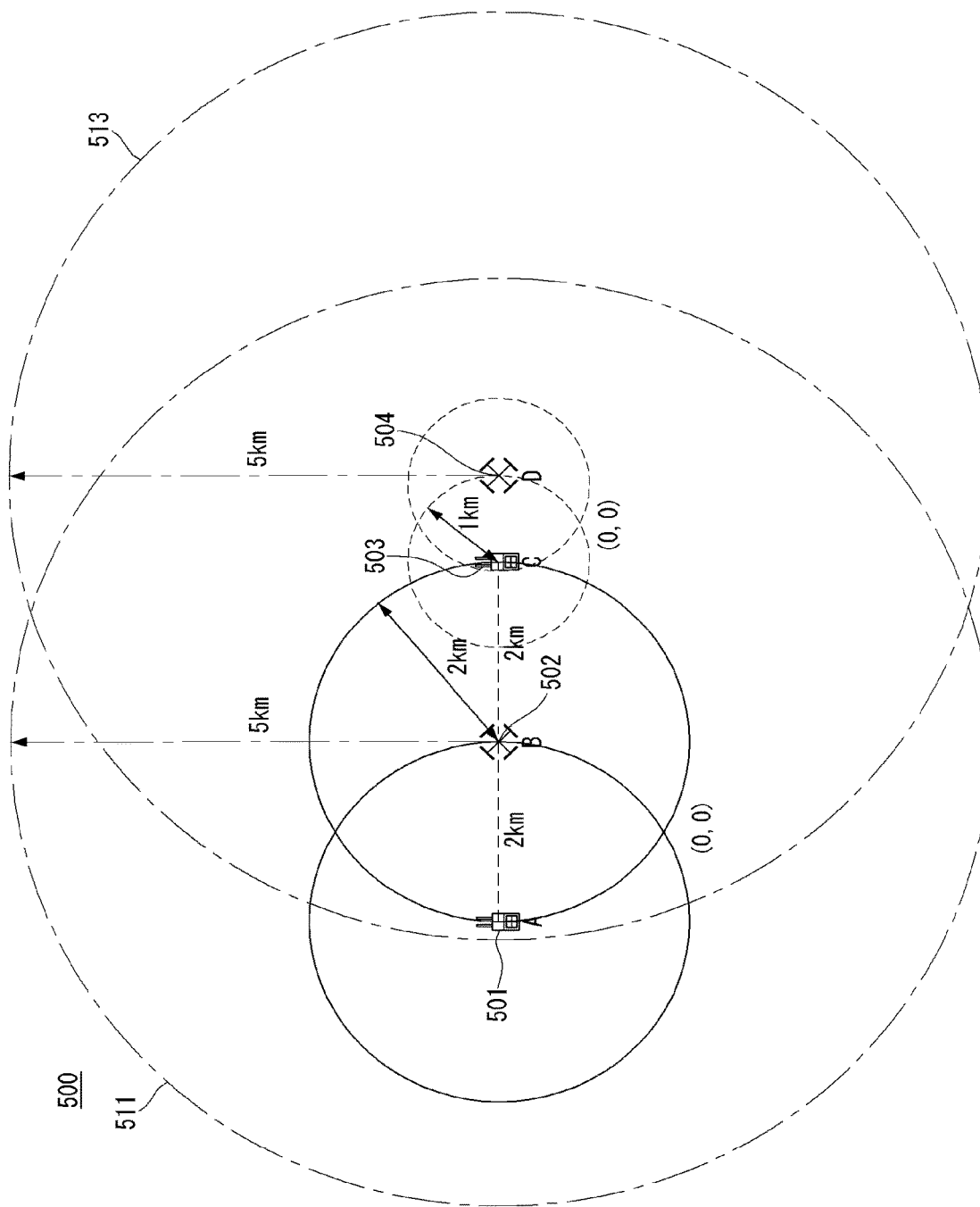

Meanwhile, in an exemplary embodiment shown in FIG. 5E, the distance between the A-B terminal pair and the C-D terminal pair may be 2 km. The one-to-one communication distance of the A-B terminal pair may be 2 km. The one-to-one communication distance of the C-D terminal pair may be 1 km. That is, the distance between the A-B terminal pair and the C-D terminal pair may have a larger value than the one-to-one communication distance of the C-D terminal pair, but may have the same or similar value as the one-toone communication distance of the A-B terminal pair. In this case, a one-to-one communication signal for the one-to-one communication of the C-D terminal pair may not cause a problem in the one-to-one communication of the A-B terminal pair, but a one-to-one communication signal for the one-to-one communication of the A-B terminal pair may cause a problem in the one-to-one communication of the C-D terminal pair. In this case, the C-D terminal pair may need to perform one-to-one channel resource allocation by excluding the one-to-one channel resource (0,0) being used by the A-B terminal pair from among the usable resources.

The C-D terminal pair may identify the distance between the terminal A and the terminal B constituting the A-B terminal pair based on the location information of the terminals A and B included in the channel resource management broadcast packet transmitted from the A-B terminal pair. When the C-D terminal pair allocates a one-to-one channel resource for one-to-one communication, it may compare the identified distance between the terminals A and B with a predetermined second threshold distance. If the distance between the terminals A and B exceeds the second threshold distance, the C-D terminal pair may exclude the one-to-one channel resource being used by the A-B terminal pair from among the usable resources, and select any one of the remaining usable resources. On the other hand, if the distance between the terminals A and B is less than or equal to the second threshold distance, the C-D terminal pair may perform one-to-one channel resource allocation for one-to-one communication of the C-D terminal pair regardless of the information on the one-to-one channel resource being used by the A-B terminal pair. In other words, the C-D terminal pair may perform one-to-one channel resource allocation without excluding the one-to-one channel resource (0,0) being used by the A-B terminal pair from among the usable resources. Here, the second threshold distance may be determined based on the one-to-one transmission power or one-to-one communication distance of each of the terminals. The threshold power may be determined based on the distance between the terminal pairs or the one-to-one communication distance of each of the terminals.

On the other hand, the C-D terminal pair may operate by combining at least some of the plurality of configurations described with reference to FIGS. 5A to 5E. For example, the C-D terminal pair may identify the distance between the A-B terminal pair and the C-D terminal pair based on the location information of the terminals A and B included in the channel resource management broadcast packet transmitted from the A-B terminal pair. In addition, the C-D terminal pair may identify information on the one-to-one transmission power included in the channel resource management broadcast packet transmitted from the A-B terminal pair. When the C-D terminal pair allocates a one-to-one channel resource for one-to-one communication, it may compare the distance between the A-B terminal pair and the C-D terminal pair and the one-to-one transmission power of the A-B terminal pair, which are identified based on the channel resource management broadcast packet, with predetermined thresholds. If the distance between the A-B terminal pair and the C-D terminal pair is less than or equal to a predetermined threshold distance, or if the one-to-one transmission power of the A-B terminal pair exceeds a predetermined threshold power, the C-D terminal pair may exclude the one-to-one channel resource being used by the A-B terminal pair, and select any one among the remaining usable resources. On the other hand, if the distance between the A-B terminal pair and the C-D terminal pair exceeds the predetermined threshold distance and the one-to-one transmission power of the A-B terminal pair is less than or equal to the predetermined threshold power, the C-D terminal pair may perform one-to-one channel resource allocation for one-to-one communication of the C-D terminal pair regardless of the information of the one-to-one channel resource being used by the A-B terminal pair. In other words, the C-D terminal pair may perform one-to-one channel resource allocation without excluding the one-to-one channel resource (0,0) being used by the A-B terminal pair from among the usable resources. Here, the threshold distance may be determined based on the one-to-one transmission power or one-to-one communication distance of each of the terminals. The threshold power may be determined based on the distance between the terminal pairs or the one-to-one communication distance of each of the terminals.

Although FIGS. 5A to 5E show exemplary embodiments in which two terminal pairs exist in the communication system 500, but exemplary embodiments of the present disclosure are not limited thereto. For example, three or more terminal pairs may exist in the communication system 500. Each terminal pair may perform an operation of allocating a one-to-one channel resource for use in performing one-to-one communication. The one-to-one channel resource allocation operation performed by each terminal pair may be performed based on the channel resource management broadcast packet(s) transmitted from one or more other terminal pairs.

Each terminal pair may identify location information of each terminal, information on a one-to-one channel resource allocated for one-to-one communication (i.e., information on a one-to-one channel resource already in use), information on a transmission power set for transmission of a one-to-one communication signal, and/or the like included in the channel resource management broadcast packet(s) transmitted from one or more other terminal pairs. Each terminal pair may identify information of one or more in-use one-to-one channel resources based on the channel resource management broadcast packet(s) transmitted from one or more other terminal pairs. Each terminal pair may or may not exclude at least some of the identified one or more already-used one-to-one channel resources from resources usable by itself in performing the one-to-one channel resource allocation operation.

Figure 6:
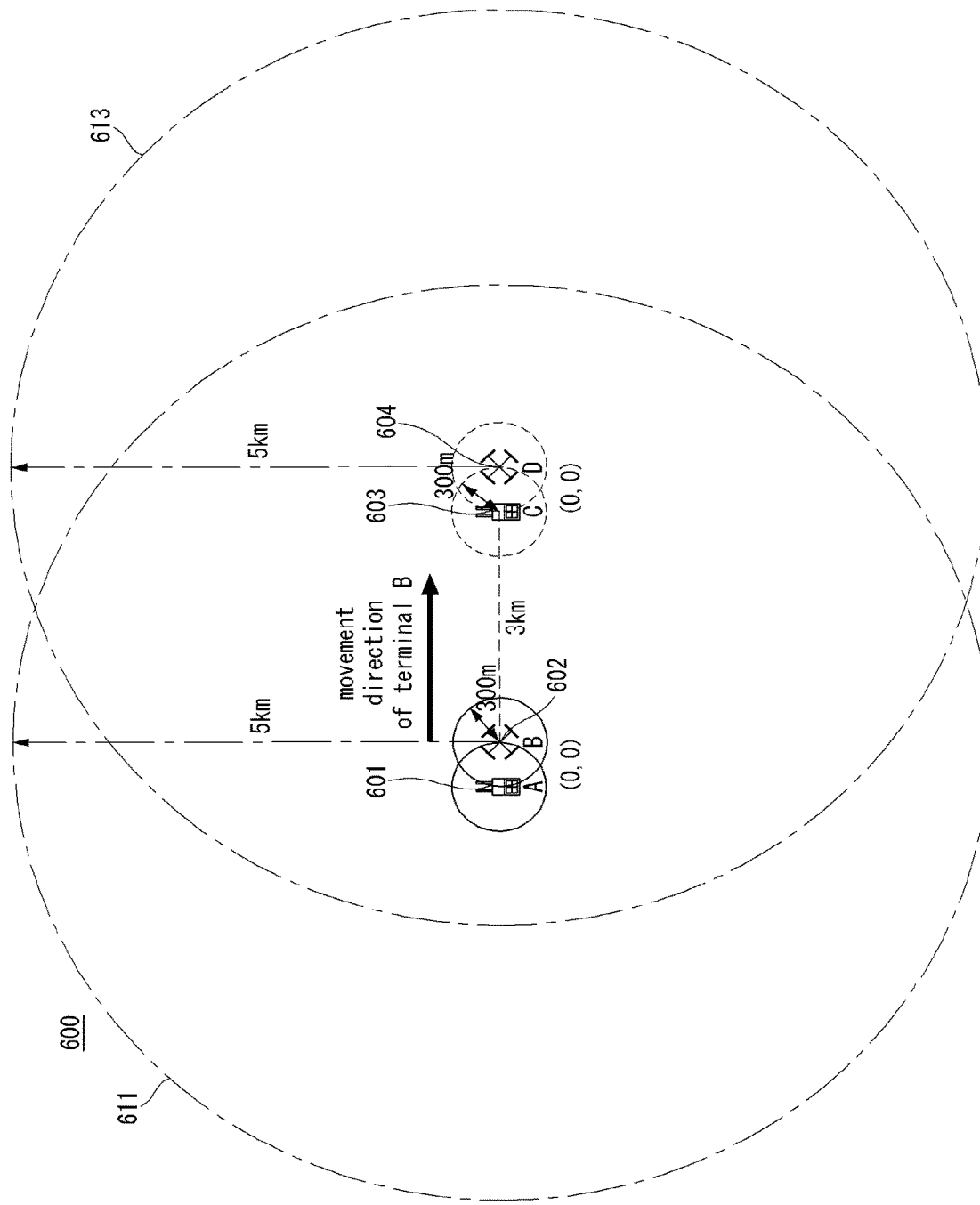
FIG. 6 is a conceptual diagram for describing a third exemplary embodiment of a channel resource management method in a communication system.

FIG. 6 is a conceptual diagram for describing a third exemplary embodiment of a channel resource management method in a communication system.

Referring to FIG. 6, a communication system 600 may be a TDMA-based synchronous wireless distributed communication system. The communication system 600 may be the same as or similar to the communication system 500 described with reference to FIGS. 5A to 5E. Communication nodes constituting the communication system 600 may include one or more distributed terminals and one or more control nodes. The communication system 600 may include terminals A and B 601 and 602 that are paired with each other and perform mutual one-to-one communication, and terminals C and D 603 and 604 that are paired with each other and perform mutual one-to-one communication. Here, the terminals A to D may be the same as or similar to the terminals A to D described with reference to FIGS. 5A to 5E. Each terminal pair may perform one-to-one communication based on a one-to-one channel resource (f,s) identical or similar to that described with reference to FIG. 3D. Hereinafter, in describing the third exemplary embodiment of the channel resource management method in the communication system with reference to FIG. 6, content overlapping with those described with reference to FIGS. 3A to 5E may be omitted.

Referring to FIG. 6, each of the A-B terminal pair and the C-D terminal pair may perform one-to-one communication by allocating a one-to-one channel resource. Even when the A-B terminal pair and the C-D terminal pair perform one-to-one communication by allocating the same one-to-one channel resource (0,0), if the distance between the two terminal pairs has a greater value than a one-to-one communication distance of each terminal pair, mutual interference or collision may not occur.

Here, when some or all of the terminals A to D move, the distance between the two terminal pairs or the one-to-one communication distance of each terminal pair may change. In this case, mutual interference or collision that has not previously occurred may newly occur. Alternatively, when a channel condition of any one of the two terminal pairs is deteriorated due to an appearance of an obstacle that did not exist before, the one-to-one communication distance of the corresponding terminal pair may change. In this case, mutual interference or collision that has not previously occurred may newly occur.

For example, in an exemplary embodiment of the communication system 600, the communication distance of each of the A-B terminal pair and the C-D terminal pair may be 300 m, and the distance between the A-B terminal pair and the C-D terminal pair may be 3 km. Here, when the terminal B moves toward the C-D terminal pair, the distance between the terminal A and the terminal B may increase. Accordingly, for smooth one-to-one communication of the A-B terminal pair, the one-to-one communication signal transmission power of the terminal A and the terminal B may be increased. In other words, the communication distance of the terminal A and the terminal B may increase. As the distance between the terminal B and the C-D terminal pair decreases and the one-to-one communication distance of the terminal B increases, the distance between the terminal B and the C-D terminal pair may exceed a threshold distance.

On the other hand, when the terminal A moves from the initial location to another location, the distance between the terminal A and the terminal B may increase. Accordingly, for smooth one-to-one communication of the A-B terminal pair, the one-to-one communication signal transmission power of the terminal A and the terminal B may be increased. In other words, the communication distance of the terminal A and the terminal B may increase. As the one-to-one communication distance of the terminal B increases, the threshold distance may decrease. As the one-to-one communication distance of the terminal B increases, the distance between the terminal B and the C-D terminal pair may exceed the threshold distance.

In this case, the A-B terminal pair may perform a channel resource reallocation operation based on the channel resource management broadcast packet periodically transmitted from the C-D terminal pair. Alternatively, the C-D terminal pair may perform a channel resource reallocation operation based on the channel resource management broadcast packet periodically transmitted from the A-B terminal pair. For example, the A-B terminal pair or the C-D terminal pair may perform an operation of changing the allocated one-to-one channel resource for one-to-one communication.

In the first to third exemplary embodiments of the channel resource management method in the communication system described with reference to FIGS. 4A to 6, configurations for avoiding or preventing interference or collision from occurring in all or some of one-to-one communications due to use of the same channel resource (f,s) by neighbor terminal pairs have been described. On the other hand, there may be a problem that mutual interference occurs even when neighbor terminal pairs use different one-to-one channel resources. An exemplary embodiment of the channel resource management method for overcoming such the problem and improving communication performance of the synchronous distributed communication system will be described in detail below with reference to FIGS. 7A and 7B.

Figure 7A:
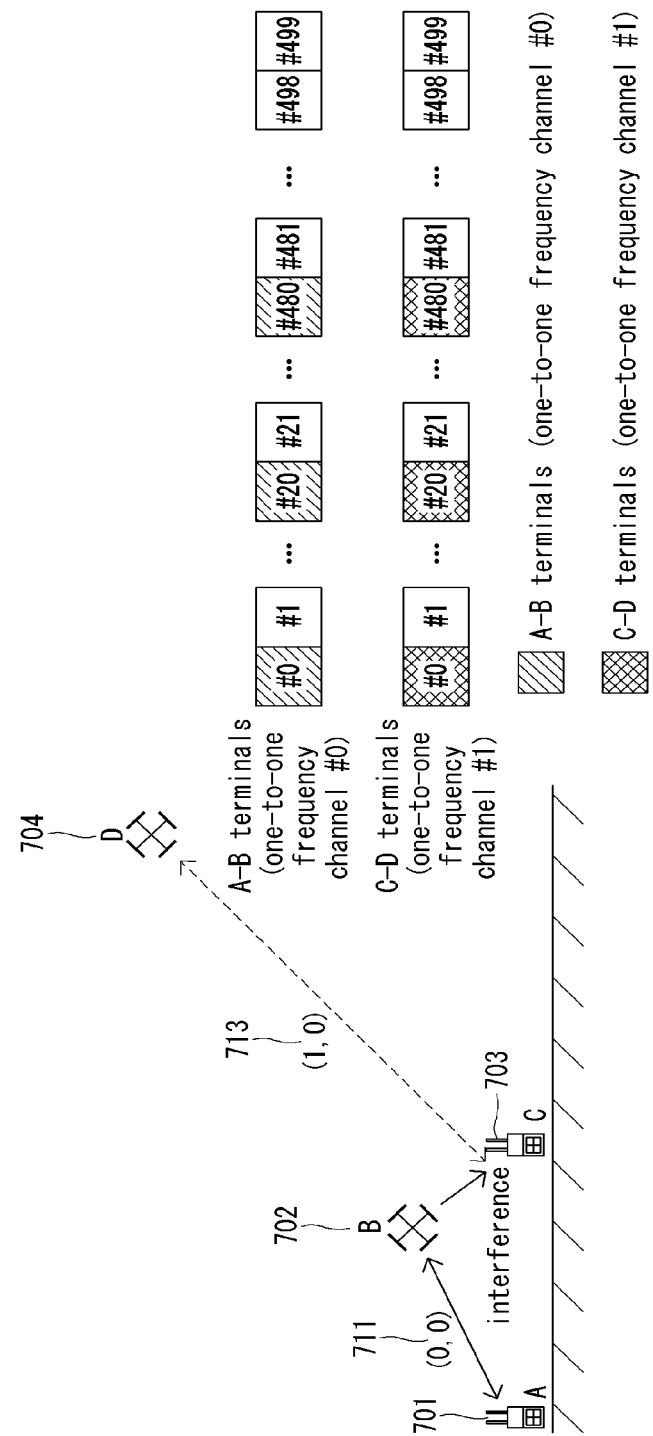
FIGS. 7A and 7B are conceptual diagrams for describing a fourth exemplary embodiment of a channel resource management method in a communication system.
Figure 7B:
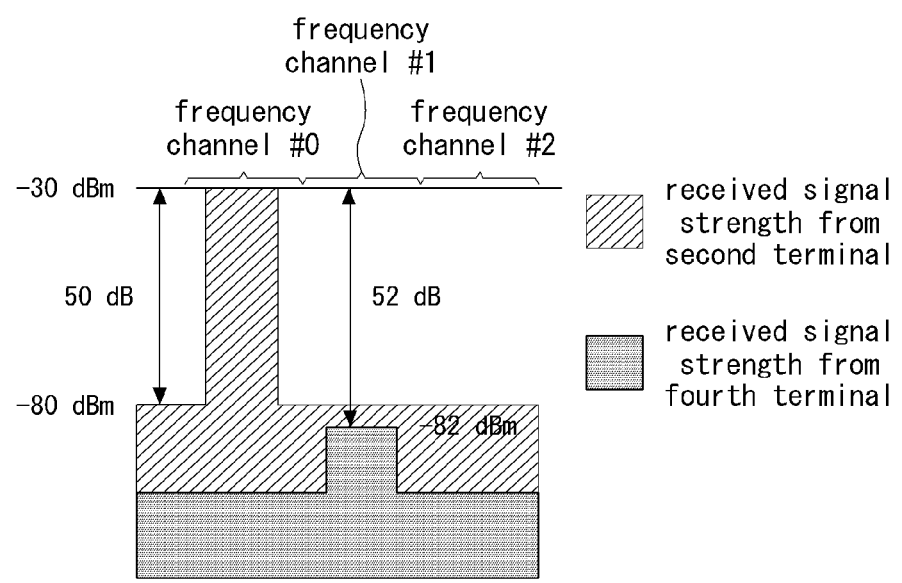

FIGS. 7A and 7B are conceptual diagrams for describing a fourth exemplary embodiment of a channel resource management method in a communication system.

Referring to FIGS. 7A and 7B, a communication system 700 may be a TDMA-based synchronous wireless distributed communication system. The communication system 700 may be the same as or similar to the communication system 500 described with reference to FIGS. 5A to 5E. Communication nodes constituting the communication system 700 may include one or more distributed terminals and one or more control nodes. The communication system 700 may include terminals A and B 701 and 702 that are paired with each other and perform mutual one-to-one communication, and terminals C and D 703 and 704 that are paired with each other and perform mutual one-to-one communication. Here, the terminals A to D may be the same as or similar to the terminals A to D described with reference to FIGS. 5A to 5E. Each terminal pair may perform one-to-one communication based on a one-to-one channel resource (f,s) identical or similar to that described with reference to FIG. 3D. A link for one-to-one communication of the A-B terminal pair may be referred to as an 'A-B link' 711, and a link for one-to-one communication of the C-D terminal pair may be referred to as a 'C-D link' 713. Hereinafter, in describing the fourth exemplary embodiment of the channel resource management method in the communication system with reference to FIGS. 7A and 7B, content overlapping with those described with reference to FIGS. 3A to 6 may be omitted.

The A-B terminal pair and C-D terminal pair, which are adjacent with each other, may perform one-to-one communication based on different one-to-one channel resources. The one-to-one channel resource used in the one-to-one communication of the A-B terminal pair may be referred to as $(f_1, s_1)$, and the one-to-one channel resource used in the one-to-one communication of the C-D terminal pair may be referred to as $(f_2, s_2)$. In an exemplary embodiment of the communication system 700, the frequency resource number $f_1$ of the one-to-one channel resource used by the A-B terminal pair and the frequency resource number $f_2$ of the one-to-one channel resource used by the C-D terminal pair may have different values. On the other hand, the time resource number $s_1$ of the one-to-one channel resource used by the A-B terminal pair and the time resource number $s_2$ of the one-to-one channel resource used by the C-D terminal pair may have the same value. That is, the A-B terminal pair and the C-D terminal pair may perform one-to-one communication at different frequencies at the same timing.

For example, the A-B terminal pair may perform one-to-one communication using slots of the one-to-one channel #0 among the one-to-one channels constituting the one-to-one frequency channel #0. On the other hand, the C-D terminal pair may perform one-to-one communication using slots of the one-to-one channel #0 among the one-to-one channels constituting the one-to-one frequency channel #1. In this case, since a one-to-one communication signal transmitted through the A-B link and a one-to-one communication signal transmitted through the C-D link are transmitted at different frequencies, mutual resource collision may not occur. On the other hand, since a one-to-one communication signal transmitted through the A-B link and a one-to-one communication signal transmitted through the C-D link may be transmitted in the same time resource, mutual interference may occur. For example, in an exemplary embodiment of the communication system 700, the terminal C may be closer to the terminal B than the terminal D performing one-to-one communication with the terminal C. Since a one-to-one communication signal transmitted through the A-B link and a one-to-one communication signal transmitted through the C-D link may be transmitted in the same time resource, an uplink signal transmitted by the terminal B and an uplink signal transmitted by the terminal D may be transmitted at the same timing. In this case, when the terminal C receives the uplink signal transmitted from the terminal D, interference due to the uplink signal transmitted from the terminal B may become a problem.

Specifically, a received strength of the uplink signal transmitted from the terminal B and received at the terminal C may have a relatively larger value than a received strength of the uplink signal transmitted from the terminal D and received at the terminal C. The uplink signal transmitted from the terminal B mainly exists in the one-to-one frequency channel #0, but a leaked component therefrom may exist in the one-to-one frequency channel #1. As described above, a frequency component other than a target frequency component in a radio signal may be referred to as a 'spurious component'. The spurious component leaked to the one-to-one frequency channel #1 from the uplink signal transmitted from the terminal B may cause interference in the one-to-one frequency channel #1. Such the interference may be referred to as 'neighbor channel interference' or 'adjacent channel interference'.

FIG. 7B shows a received signal strength for each frequency channel in the terminal C. In an exemplary embodiment shown in FIG. 7B, the received strength of the uplink signal transmitted from the terminal B and received at the terminal C through the one-to-one frequency channel #0 may have a value of −30 dBm. Meanwhile, the received strength of the spurious component of the uplink signal transmitted from the terminal B which is received at the terminal C may have a value less than −30 dBm. For example, the uplink signal transmitted from the terminal B may be received with a received strength lower by 50 dB when received through one of other one-to-one frequency channels (e.g., one-to-one frequency channels #1, #2, etc.) than when received through the one-to-one frequency channel #0. That is, the received strength of the spurious component of the uplink signal transmitted from the terminal B and received at the terminal C through the one-to-one frequency channel #1 may correspond to −80 dBm. The magnitude of the neighbor channel interference generated by the uplink signal transmitted from the terminal B with respect to the one-to-one frequency channel #1 may be −80 dBm.

Meanwhile, the distance between the terminal D and the terminal C may be greater than the distance between the terminal B and the terminal C. In this case, the uplink signal transmitted from the terminal D may be received at the terminal C with a lower received strength than the uplink signal transmitted from the terminal B. For example, the received strength of the uplink signal transmitted from the terminal D and received at the terminal C through the one-to-one frequency channel #1 may have a value of −82 dBm. This is lower by 52 dB than the received strength of the uplink signal transmitted from the terminal B and received at the terminal C through the one-to-one frequency channel #0, and lower by 2 dB than the received strength of the spurious component of the uplink signal transmitted from the terminal B and received at the terminal C through the one-to-one frequency channel #1.

When one or more terminal pairs exist in addition to the A-B terminal pair and the C-D terminal pair in the communication system 700, a neighbor channel interference from other terminal pairs other than the A-B terminal pair may further occur at the terminal C. In this case, the terminal C may calculate a 'total neighbor channel interference' value by summing values of all identified neighbor channel interferences. The terminal C may monitor the neighbor channel interferences in real time and calculate the total neighbor channel interference value. The terminal C may compare the total neighbor channel interference value with a preset neighbor channel interference threshold in real time. When the total neighbor channel interference value exceeds the preset neighbor channel interference threshold, the terminal C may reallocate the one-to-one channel resource for one-to-one communication with the terminal D.

For example, in an exemplary embodiment of the communication system 700, a first neighbor channel interference threshold may be set in the terminal C. Here, the first neighbor channel interference threshold may be set to −110 dBm. The terminal C may perform reallocation of the one-to-one channel resource for one-to-one communication with terminal D when the total neighbor channel interference value exceeds −110 dBm during monitoring of the total neighbor channel interference value. As a result of the reallocation of the one-to-one channel resource, the C-D terminal pair may perform one-to-one communication using a one-to-one channel resource $(f_3, s_3)$ different from the one-to-one channel resource $(f_2, s_2)$ previously used in the one-to-one communication. Here, $s_3$, which is the time resource number of the newly allocated one-to-one channel resource $(f_3, s_3)$, may have a different value from $s_2$, which is the time resource number of the previously used one-to-one channel resource $(f_2, s_2)$.

That is, when the neighbor channel interference due to one or more other terminal pairs such as the A-B terminal pair using the one-to-one channel resource having the same time resource number exceeds the preset threshold, the C-D terminal pair may perform reallocation of the one-to-one channel resource, and newly allocate a one-to-one channel resource having a different time resource number. In this manner, it is made possible to avoid the influence of the neighbor channel interference due to other terminal pairs.

On the other hand, when a movement speed of each terminal is fast or the communication environment is rapidly changed for other reasons, the influence of neighbor channel interference between neighbor terminal pairs may also change rapidly. When the influence of neighbor channel interference between neighbor terminal pairs changes rapidly, a problem situation due to the neighbor channel interference may occur before the one-to-one channel resource reallocation according to monitoring of the total neighbor channel interference value is completely performed. In order to solve such the instability problem, a plurality of neighbor channel interference thresholds may be set in the communication system 700 or each terminal. Each terminal may determine whether to reallocate the one-to-one channel resource based on the neighbor channel interference thresholds set in a plurality of steps.

For example, in an exemplary embodiment of the communication system 700, a second neighbor channel interference threshold may be additionally set to the terminal C in addition to the first neighbor channel interference threshold. The second neighbor channel interference threshold may be set to have a value lower than the first neighbor channel interference threshold. For example, the first neighbor channel interference threshold may be set to −110 dBm, and the second neighbor channel interference threshold may be set to −116 dBm. The terminal C may determine whether to reallocate the one-to-one channel resource based on the first neighbor channel interference threshold and the second neighbor channel interference threshold while monitoring the total neighbor channel interference value.

The terminal C may monitor the total neighbor channel interference value, and may not perform the one-to-one channel resource reallocation in a situation where the total neighbor channel interference value is less than or equal to the second neighbor channel interference threshold. The terminal C may perform the one-to-one channel resource reallocation in a situation where the total neighbor channel interference value exceeds the first neighbor channel interference threshold. On the other hand, in a situation where the total neighbor channel interference value exceeds the second neighbor channel interference threshold and is less than or equal to the first neighbor channel interference threshold, the terminal C may compare a duration of the corresponding situation with a preset threshold time. If the duration in which the total neighbor channel interference value exceeds the second neighbor channel interference threshold and is less than or equal to the first neighbor channel interference threshold is less than or equal to the preset threshold time, the terminal C may not perform the one-to-one channel resource reallocation due to the neighbor channel interference. On the other hand, if the duration in which the total neighbor channel interference value exceeds the second neighbor channel interference threshold and is less than or equal to the first neighbor channel interference threshold exceeds the preset threshold time, the terminal C may perform the one-to-one channel resource reallocation.

For example, in an exemplary embodiment of the communication system 700, the first neighbor channel interference threshold may be set to −110 dBm, the second neighbor channel interference threshold may be set to −116 dBm, and the preset threshold time may be set to 5 seconds. Here, the terminal C may not perform the one-to-one channel resource reallocation due to the neighbor channel interference in a situation where the total neighbor channel interference value is −116 dBm or less. The terminal C may perform the one-to-one channel resource reallocation when a situation where the neighbor channel interference value exceeds −116 dBm and is less than or equal to −110 dBm continues for more than 5 seconds. If the situation where the neighbor channel interference value exceeds −116 dBm and is less than or equal to −110 dBm does not last for more than 5 seconds, and the neighbor channel interference value again becomes −116 dBm or less, the terminal C may not perform the one-to-one channel resource reallocation due to the neighbor channel interference. The terminal C 703 may perform the one-to-one channel resource reallocation in a situation where the neighbor channel interference value exceeds −110 dBm. However, this is only an example for convenience of description, and exemplary embodiments of the present disclosure are not limited thereto.

In the fourth exemplary embodiment of the channel resource management method in the communication system described with reference to FIGS. 7A and 7B, the configurations for determining and performing one-to-one channel resource reallocation when the influence of neighbor channel interference from neighbor terminal pairs using the one-to-one channel resource having the same time resource number have been described. On the other hand, based on the channel resource management broadcast packet periodically transmitted from the terminal pairs, each terminal pair may predict a change pattern of the communication environment or a future communication environment, thereby determining and performing the one-to-one channel resource reallocation before the influence of neighbor channel interference increases by more than a certain level. An exemplary embodiment of the channel resource management method for determining and performing one-to-one channel resource reallocation in advance based on the channel resource management broadcast packet will be described in detail below with reference to FIG. 8.

Figure 8:
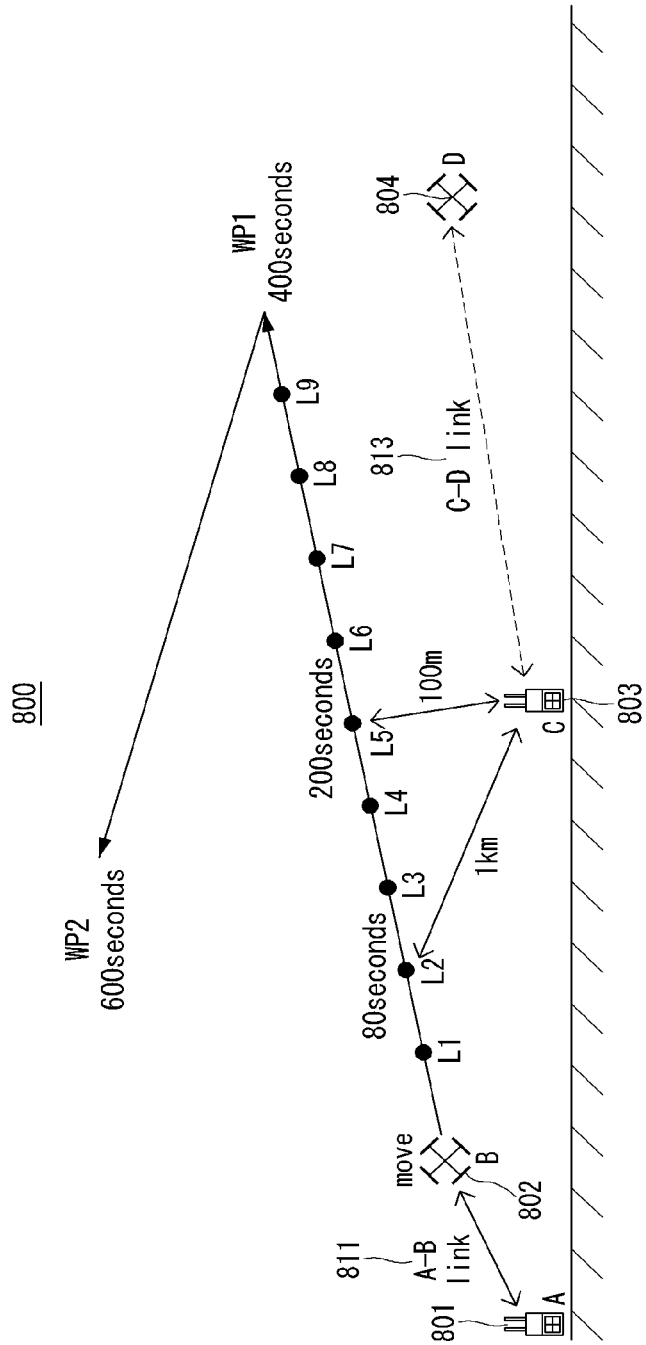
FIG. 8 is a conceptual diagram for describing a fifth exemplary embodiment of a channel resource management method in a communication system.

FIG. 8 is a conceptual diagram for describing a fifth exemplary embodiment of a channel resource management method in a communication system.

Referring to FIG. 8, a communication system 800 may be a TDMA-based synchronous wireless distributed communication system. The communication system 800 may be the same as or similar to the communication system 700 described with reference to FIGS. 7A and 7B. Communication nodes constituting the communication system 800 may include one or more distributed terminals and one or more control nodes. The communication system 800 may include terminals A and B 801 and 802 that are paired with each other and perform mutual one-to-one communication, and terminals C and D 803 and 804 that are paired with each other and perform mutual one-to-one communication. Here, the terminals A to D may be the same as or similar to the terminals A to D described with reference to FIGS. 7A and 7B. Each terminal pair may perform one-to-one communication based on a one-to-one channel resource (f,s) identical or similar to that described with reference to FIG. 3D. A link for one-to-one communication of the A-B terminal pair may be referred to as an 'A-B link' 811, and a link for one-to-one communication of the C-D terminal pair may be referred to as a 'C-D link' 813. Hereinafter, in describing the fifth exemplary embodiment of the channel resource management method in a communication system with reference to FIG. 8, content overlapping with those described with reference to FIGS. 3A to 7B may be omitted.

In an exemplary embodiment of the communication system 800, at least one of the terminals constituting the A-B terminal pair may periodically transmit a channel resource management broadcast packet through the broadcast frequency channel. At least one of the terminals constituting the C-D terminal pair may periodically transmit a channel resource management broadcast packet through the broadcast frequency channel. The channel management broadcast packet may include information such as location information of the terminals constituting each terminal pair, information on a one-to-one channel resource allocated for one-to-one communication of each terminal pair, information on a transmission power set for transmission of a one-to-one communication signal. Here, the channel management broadcast packet may further include movement path information of at least some of the terminals constituting each terminal pair.

For example, the terminal B corresponding to a distributed terminal in the A-B terminal pair may move on the ground or in the air in the communication environment. The channel management broadcast packet periodically transmitted from the A-B terminal pair may include movement path information of the terminal B. The C-D terminal pair may identify the movement path information of the terminal B based on the channel management broadcast packet periodically transmitted from the A-B terminal pair. On the other hand, the terminal D corresponding to a distributed terminal in the C-D terminal pair may move on the ground or in the air in the communication environment. The channel management broadcast packet periodically transmitted from the C-D terminal pair may include movement path information of the terminal D. The A-B terminal pair may identify the movement path information of the terminal D based on the channel management broadcast packet periodically transmitted from the C-D terminal pair.

In an exemplary embodiment of the communication system 800, the movement path information of the terminal included in the channel management broadcast packet may include information on one or more way points (WPs). For example, as shown in FIG. 8, the terminal B may move on a movement path including a WP1 and a WP2. The information on the one or more WPs included in the movement path information of the terminal B may include location information of each WP, information on an estimated time required for the terminal B to arrive at each WP, and the like. Here, the location information of each WP may include information such as latitude, longitude, and altitude of each WP. The location information of each WP may be set based on an absolute coordinate, or may be set based on a relative coordinate according to a relative position with the terminal B. The information on the estimated time required for the terminal B to arrive at each WP may include 400 seconds estimated for the terminal B 802 to arrive at the WP1, and 600 seconds estimated for the terminal B to arrive at the WP2. The movement path information of the terminal B may further include movement speed information and movement direction information of the terminal B at a corresponding time point.

The A-B terminal pair and C-D terminal pair, which are adjacent with each other, may perform one-to-one communications based on different one-to-one channel resources. The one-to-one channel resource used in the one-to-one communication of the A-B terminal pair may be referred to as $(f_1, s_1)$, and the one-to-one channel resource used in the one-to-one communication of the C-D terminal pair may be referred to as $(f_2, s_2)$. In the A-B link, one-to-one communication based on the one-to-one channel resource $(f_1, s_1)$ may be performed, and in the C-D link, one-to-one communication based on the one-to-one channel resource $(f_2, s_2)$ may be performed.

The terminal C may receive the channel management broadcast packet transmitted from terminal B. The terminal C may identify the location information of the terminal B and the movement path information of the terminal B based on the channel management broadcast packet transmitted from the terminal B. The terminal C may calculate or predict the future positions of the terminal B based on the location information of the terminal B and the movement path information of the terminal B, and the like identified based on the channel management broadcast packet. For example, the terminal C may predict that the terminal B is to pass through locations L1, L2, . . . , L9, and the like before the terminal B arrives at the WP1. The terminal C may calculate or predict a time point at which the terminal B is to pass through each of the locations L1, L2, . . . , L9, and the like. For example, the terminal C may predict that the terminal B is to pass through the location L2 which is 1 km away from the terminal C after 80 seconds. The terminal C may predict that the terminal B is to pass through the location L5 which is 100 m away from the terminal C after 200 seconds.

The terminal C may identify information on the one-to-one channel resource $(f_1, s_1)$ being used by the A-B terminal pair for one-to-one communication based on the channel management broadcast packet. The terminal C may compare information of the one-to-one channel resource $(f_1, s_1)$ being used by the A-B terminal pair for one-to-one communication with information of the one-to-one channel resource $(f_2, s_2)$ being used by the C-D terminal pair for one-to-one communication.

If the one-to-one channel resource $(f_1, s_1)$ being used by the A-B terminal pair for one-to-one communication and the one-to-one channel resource $(f_2, s_2)$ being used by the C-D terminal pair for one-to-one communication are the same, as the distance between the A-B terminal pair and the C-D terminal pair gets closer, the possibility of a mutual resource collision may increase. In this case, the terminal C may perform one-to-one channel resource reallocation based on the channel management broadcast packet, when the distance between the terminal B and the terminal C becomes closer than a first threshold distance. Here, the first threshold distance may be determined based on information included in the received channel management broadcast packet. For example, the first threshold distance may be 1 km. In the situation shown in FIG. 8, the terminal C may identify or calculate that the terminal B is to move to the location L2 after 80 seconds and is to be located within 1 km from itself, based on the channel management broadcast packet. The terminal C may perform one-to-one channel resource reallocation before the terminal B moves to a location within 1 km from itself, such as the location L2. Through this, the resource collision problem between the A-B terminal pair and the C-D terminal pair may be prevented in advance. However, this is only an example for convenience of description, and exemplary embodiments of the present disclosure are not limited thereto.

If the one-to-one channel resource $(f_1, s_1)$ being used by the A-B terminal pair for one-to-one communication and the one-to-one channel resource $(f_2, s_2)$ being used by the C-D terminal pair for one-to-one communication have different frequency resource numbers and the time resource numbers (i.e., $f_1 \neq f_2$ and $s_1 = s_2$), as the distance between the A-B terminal pair and the C-D terminal pair gets closer, the possibility of occurrence of a problem of mutual neighbor channel interference may increase. In this case, the terminal C may perform one-to-one channel resource reallocation when the distance between the terminal B and the terminal C is closer than a second threshold distance based on the channel management broadcast packet. Here, the second threshold distance may be determined based on information included in the received channel management broadcast packet. For example, the second threshold distance may be 100 m. In the situation shown in FIG. 8, the terminal C may identify or calculate that the terminal B is to move to the location L5 after 200 seconds and is to be located within 100 m from itself based on the channel management broadcast packet. The terminal C may perform one-to-one channel resource reallocation before the terminal B moves to a location within 100 m from itself, such as the location L5. Through this, the resource collision problem between the A-B terminal pair and the C-D terminal pair may be prevented in advance. However, this is only an example for convenience of description, and exemplary embodiments of the present disclosure are not limited thereto.

Figure 9:
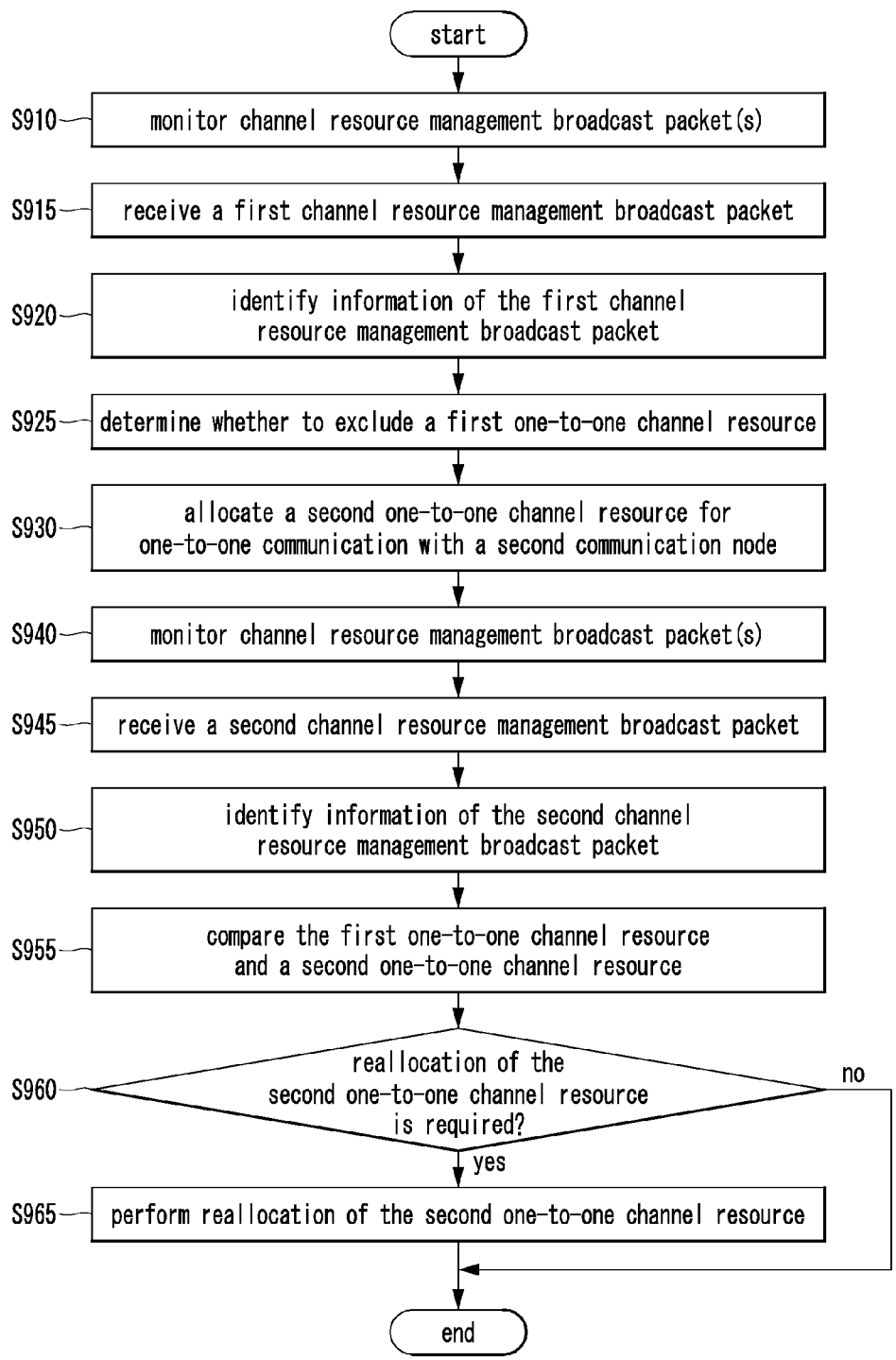
FIG. 9 is a flowchart illustrating an exemplary embodiment of a channel resource management method in a communication system.

FIG. 9 is a flowchart illustrating an exemplary embodiment of a channel resource management method in a communication system.

Referring to FIG. 9, a communication system may be a TDMA-based synchronous wireless distributed communication system. The communication system may be the same as or similar to the communication system 400, 500, 600, 700, or 800 described with reference to FIGS. 4A to 8. Communication nodes constituting the communication system may include one or more distributed terminals and one or more control nodes. The communication system may include first and second communication nodes that are paired with each other and perform mutual one-to-one communication, and third and fourth communication nodes that are paired with each other and perform mutual one-to-one communication. Here, the first communication node may be the same as or similar to the terminal C described with reference to FIGS. 4A to 8, the second communication node may be the same as or similar to the terminal D described with reference to FIGS. 4A to 8, the third communication node may be the same as or similar to the terminal A described with reference to FIGS. 4A to 8, and the fourth communication node may be the same as or similar to the terminal B described with reference to FIGS. 4A to 8. The pair comprising the first and second communication node may be referred to as 'first-second node pair', and the pair comprising the third and fourth communication node may be referred to as 'third-fourth node pair'. Each node pair may perform one-to-one communication based on a one-to-one channel resource (f,s) identical or similar to that described with reference to FIG. 3D. A link for one-to-one communication of the first-second node pair may be referred to as an 'first-second link', and a link for one-to-one communication of the third-fourth node pair may be referred to as a 'third-fourth link'. Hereinafter, in describing an exemplary embodiment of the channel resource management method in a communication system with reference to FIG. 9, content overlapping with those described with reference to FIGS. 3A to 8 may be omitted.

In the present disclosure, a 'distance between two node pairs' may refer to the closest distance among distances between communication nodes constituting each of the two node pairs. For example, the distance between the first-second node pair and the third-fourth node pair may be the closest distance among the distance between the first communication node 901 and the third communication node 903, the distance between the first communication node 901 and the fourth communication node 904, the distance between the second communication node 902 and the third communication node 903, and the distance between the second communication node 902 and the fourth communication node 904.

The first communication node of the communication system may desire to be paired with the second communication node to perform one-to-one communication. Prior to performing one-to-one channel resource allocation for one-to-one communication with the second communication node, the first communication node may monitor a channel resource management broadcast packet transmitted from another communication node or another node pair in a communication environment (S910).

The first communication node may receive a channel resource management broadcast packet transmitted from the third-fourth node pair (S915). The first communication node may identify information included in a first channel resource management broadcast packet transmitted from the third-fourth node pair. For example, the first communication node may receive the first channel resource management broadcast packet transmitted from the fourth communication node paired with the third communication node to perform one-to-one communication. Here, the first channel resource management broadcast packet may include location information of the third and fourth communication nodes. The first channel resource management broadcast packet may include information on a first one-to-one channel resource allocated for one-to-one communication of the third-fourth node pair. The first channel resource management broadcast packet may include information on a first transmission power set for transmission of a one-to-one communication signal of the fourth communication node or the third-fourth node pair. The first communication node may identify the information included in the first channel resource management broadcast packet transmitted from the third-fourth node pair (S920). The first communication node may identify the location information, the information on the first one-to-one channel resource, the information on the first transmission power, and the like included in the first channel resource management broadcast packet.

The first communication node may perform one-to-one channel resource allocation for one-to-one communication with the second communication node based on the information included in the channel resource management broadcast packet transmitted from the third-fourth node pair. Specifically, the first communication node may determine whether to configure the first one-to-one channel resource being used for the one-to-one communication of the third-fourth node pair identified based on the information included in the channel resource management broadcast packet transmitted from the third-fourth node pair as a one-to-one channel resource unusable for one-to-one communication of the first-second node pair (S925). In other words, the first communication node may determine whether to exclude the first one-to-one channel resource identified as being used for the one-to-one communication of the third-fourth node pair, from among the one-to-one channel resources usable in the one-to-one communication of the first-second node pair (S925).

For example, in an exemplary embodiment of the communication system, the first communication node may determine the first one-to-one channel resource being used for the one-to-one communication of the third-fourth node pair identified based on the information included in the channel resource management broadcast packet transmitted from the third-fourth node pair as a one-to-one channel resource unusable for one-to-one communication of the first-second node pair. This may be the same as or similar to the operation of the C-D terminal pair described with reference to FIG. 5B.

In an exemplary embodiment of the communication system, the first communication node may determine a distance between the first-second node pair and the third-fourth node pair based on the location information identified in the step S920. The first communication node may compare the distance between the first-second node pair and the third-fourth node pair with a predetermined first threshold distance. Based on the comparison result, the first communication node may determine whether to configure the first one-to-one channel resource being used for the one-to-one communication of the third-fourth node pair as a one-to-one channel resource unusable for one-to-one communication of the first-second node pair. This may be the same as or similar to the operation of the C-D terminal pair described with reference to FIG. 5C. For example, if the distance between the first-second node pair and the third-fourth node pair has a value greater than the first threshold distance, the first communication node may perform one-to-one channel resource allocation regardless of the information of the first one-to-one channel resource. In other words, if the distance between the first-second node pair and the third-fourth node pair has a value greater than the first threshold distance, the first communication node may not classify the first one-to-one channel resource as an unusable one-to-one channel resource. On the other hand, if the distance between the first-second node pair and the third-fourth node pair is less than or equal to the first threshold distance, the first communication node may classify the first one-to-one channel resource as an unusable one-to-one channel resource. In other words, if the distance between the first-second pair of nodes and the third-fourth pair of nodes is less than or equal to the first threshold distance, the first communication node may exclude the first one-to-one channel resource from usable one-to-one channel resources.

In an exemplary embodiment of the communication system, the first communication node may identify the distance between the third communication node and the fourth communication node based on the location information identified in the step S920. The first communication node may compare the distance between the third communication node and the fourth communication node with a predetermined second threshold distance. Based on the comparison of the distance between the third communication node and the fourth communication node and the second threshold distance, the first communication node may determine whether to configure the first one-to-one channel resource being used for the one-to-one communication of the third-fourth node pair as a one-to-one channel resource unusable for one-to-one communication of the first-second node pair. This may be the same as or similar to the operation of the C-D terminal pair described with reference to FIG. 5E. For example, if the distance between the third communication node and the fourth communication node is less than or equal to the second threshold distance, the first communication node may perform one-to-one channel resource allocation regardless of the information on the first one-to-one channel resource. In other words, if the distance between the third communication node and the fourth communication node is less than or equal to the second threshold distance, the first communication node may not classify the first one-to-one channel resource as an unusable one-to-one channel resource. On the other hand, if the distance between the third communication node and the fourth communication node exceeds the second threshold distance, the first communication node may classify the first one-to-one channel resource as an unusable one-to-one channel resource. In other words, if the distance between the third communication node and the fourth communication node exceeds the second threshold distance, the first communication node may exclude the first one-to-one channel resource from usable one-to-one channel resources.

On the other hand, in an exemplary embodiment of the communication system, the first communication node may compare the information of the first transmission power identified in the step S920 with a predetermined threshold power. Based on the comparison of the first transmission power and the predetermined threshold power, the first communication node may determine whether to configure the first one-to-one channel resource being used for the one-to-one communication of the third-fourth node pair as a one-to-one channel resource unusable for one-to-one communication of the first-second node pair. This may be the same as or similar to the operation of the C-D terminal pair described with reference to FIG. 5D. For example, if the first transmission power is equal to or less than the predetermined threshold power, the first communication node may perform one-to-one channel resource allocation regardless of information on the first one-to-one channel resource. In other words, if the first transmission power is equal to or less than the predetermined threshold power, the first communication node may not classify the first one-to-one channel resource as an unusable one-to-one channel resource. On the other hand, if the first transmission power exceeds the predetermined threshold power, the first communication node may classify the first one-to-one channel resource as an unusable one-to-one channel resource. In other words, if the first transmission power exceeds the predetermined threshold power, the first communication node may exclude the first one-to-one channel resource from usable one-to-one channel resources.

On the other hand, in an exemplary embodiment of the communication system, the first communication node may identify the distance between the first-second node pair and the third-fourth node pair based on the location information identified in the step S920. The first communication node may compare the distance between the first-second node pair and the third-fourth node pair and the first transmission power identified in the step S920 with predetermined thresholds. Based on the comparison of the distance between the first-second node pair and the third-fourth node pair and the first transmission power with the predetermine thresholds, the first communication node may determine whether to configure the first one-to-one channel resource being used for the one-to-one communication of the third-fourth node pair as a one-to-one channel resource unusable for one-to-one communication of the first-second node pair. This may be the same as or similar to the operation of the C-D terminal pair described with reference to FIGS. 5A to 5E. For example, if the distance between the first-second node pair and the third-fourth node pair exceeds a first threshold distance and the first transmission power is less than or equal to a predetermined threshold power, the first communication node may perform one-to-one channel resource allocation regardless of information on the first one-to-one channel resource. In other words, if the distance between the first-second node pair and the third-fourth node pair exceeds the first threshold distance and the first transmission power is equal to or less than the predetermined threshold power, the first communication node may not classify the first one-to-one channel resource as an unusable one-to-one channel resource. On the other hand, if the distance between the first-second node pair and the third-fourth node pair is equal to or less than the first threshold distance or the first transmission power exceeds the predetermined threshold power, the first communication node may classify the first one-to-one channel resource as an usable one-to-one channel resource. In other words, if the distance between the first-second node pair and the third-fourth node pair is less than or equal to the first threshold distance or the first transmission power exceeds the predetermined threshold power, the first communication node may exclude the first one-to-one Channel resources from usable one-to-one channel resources.

Based on the determination result in the step S925, the first communication node may perform one-to-one channel resource allocation for one-to-one communication with the second communication node (S930). In other words, the first communication node may perform one-to-one channel resource allocation for one-to-one communication of the first-second node pair. A one-to-one channel resource allocated for one-to-one communication of the first-second node pair may be referred to as a 'second one-to-one channel resource'. After the one-to-one channel resource allocation for the one-to-one communication of the first-second pair of nodes is performed, the first communication node may monitor a channel resource management broadcast packet transmitted from another communication node or another node pair in the communication environment (S940).

The first communication node may receive a second channel resource management broadcast packet transmitted from the third-fourth node pair (S945). The first communication node may identify information included in the second channel resource management broadcast packet transmitted from the third-fourth node pair (S950). The second channel resource management broadcast packet may include location information of the first and second communication nodes, information on the first one-to-one channel resource, information on the first transmission power, and the like.

The first communication node may compare the information of the first one-to-one channel resource ($f_1$, $s_1$) identified through the second channel resource management broadcast packet with the second one-to-one channel resource ($f_2$, $s_2$) allocated for one-to-one communication of the first-second node pair (S955). Based on the comparison operation in the step S955, the first communication node may determine whether reallocation of the second one-to-one channel resource ($f_2$, $s_2$) being used is required (S960).

In an exemplary embodiment of the communication system, if the frequency resource numbers and time resource numbers of the first one-to-one channel resource ($f_1$, $s_1$) and the second one-to-one channel resource ($f_2$, $s_2$) do not match (i.e., $f_1 \neq f_2$ and $s_4 \neq s_2$), the first communication node may determine that one-to-one channel resource reallocation is not required.

In an exemplary embodiment of the communication system, if the first one-to-one channel resource ($f_1$, $s_1$) and the second one-to-one channel resource ($f_2$, $s_2$) coincide (i.e., $f_1=f_2$ and $s_1=s_2$), the first communication may determine whether one-to-one channel resource reallocation is required to avoid a resource collision between the first-second node pair and the third-fourth node pair. This may be the same as or similar to the operation of the C-D terminal pair described with reference to FIGS. 6 and 8.

For example, the first communication node may identify the distance between the first-second node pair and the third-fourth node pair based on the location information identified in the step S950. The first communication node may compare the distance between the first-second node pair and the third-fourth node pair with the first threshold distance. If the distance between the first-second node pair and the third-fourth node pair has a value greater than the first threshold distance, the first communication node may determine that reallocation of the second one-to-one channel resource is not required. On the other hand, if the distance between the first-second node pair and the third-fourth node pair is equal to or less than the first threshold distance, the first communication node may determine that reallocation of the second one-to-one channel resource is required.

Meanwhile, the first communication node may identify the distance between the third and fourth communication nodes based on the location information identified in the step S950. The first communication node may compare the distance between the third and fourth communication nodes with the second threshold distance. If the distance between the third and fourth communication nodes is equal to or less than the second threshold distance, the first communication node may determine that reallocation of the second one-to-one channel resource is not required. On the other hand, if the distance between the third and fourth communication nodes exceeds the second threshold distance, the first communication node may determine that reallocation of the second one-to-one channel resource is required.

Meanwhile, the first communication node may compare the information of the first transmission power identified in the step S950 with a predetermined threshold power. If the first transmission power is equal to or less than the predetermined threshold power, the first communication node may determine that reallocation of the second one-to-one channel resource is not required. On the other hand, if the first transmission power exceeds the predetermined threshold power, the first communication node may determine that reallocation of the second one-to-one channel resource is required.

Meanwhile, the first communication node may compare the distance between the first-second node pair and the third-fourth node pair and the first transmission power identified in the step S950 with predetermined thresholds. If the distance between the first-second node pair and the third-fourth node pair exceeds the first threshold distance and the first transmission power is less than or equal to the predetermined threshold power, the first communication node may determine that reallocation of the second one-to-one channel is not required. On the other hand, if the distance between the first-second node pair and the third-fourth node pair is equal to or less than the first threshold distance or the first transmission power exceeds the predetermined threshold power, the first communication node may determine that reallocation of the second one-to-one channel resource is required.

Meanwhile, the second channel management broadcast packet transmitted from the third-fourth node pair may include movement path information of the third and fourth communication nodes. Based on the second channel management broadcast packet transmitted from the third-fourth node pair, the first communication node may identify the movement path information of the third and fourth communication nodes. Here, the movement path information may include information on one or more way points (WPs). The information on the one or more WPs may include location information of each WP, information on an estimated time required for the third or fourth communication node to arrive at each WP, and the like. The movement path information of the third and fourth communication nodes may further include movement speed information and movement direction information of the third and fourth communication nodes at a corresponding time point.

The first communication node may calculate estimated locations of the third and fourth communication nodes based on the movement path information of the third and fourth communication nodes. The first communication node may predict or calculate a time point at which the third and fourth communication nodes pass through each of the predicted locations based on the movement path information of the third and fourth communication nodes. The first communication node may calculate or predict a time point at which the distance between the first-second node pair and the third-fourth node pair becomes less than or equal to a predetermined third threshold distance. Here, the third threshold distance may be determined to be the same as or different from the first threshold distance. For example, the first communication node may predict that the distance between the first-second node pair and the third-fourth node pair is to be equal to or less than the third threshold distance after a first time elapses. Accordingly, the first communication node may determine that reallocation of the second one-to-one channel resource needs to be performed before the first time elapses and the distance between the first-second node pair and the third-fourth node pair becomes less than or equal to the third threshold distance.

Meanwhile, in an exemplary embodiment of the communication system, if the first one-to-one channel resource ($f_1$, $s_1$) and the second one-to-one channel resource ($f_2$, $s_2$) have different frequency resource numbers and the same time resource number (i.e., $f_1$ $f_2$ and $s_1=s_2$), the first communication node may determine whether one-to-one channel resource reallocation is required to avoid neighbor channel interference between the first-second node pair and the third-fourth node pair. This may be the same as or similar to the operation of the C-D terminal pair described with reference to FIG. 8.

For example, the channel management broadcast packet periodically transmitted from the third-fourth node pair may include movement path information of the third and fourth communication nodes. Based on the channel management broadcast packet periodically transmitted from the third-fourth node pair, the first communication node may identify the movement path information of the third and fourth communication nodes. The first communication node may calculate or predict a time point at which the distance between the first-second node pair and the third-fourth node pair is to be equal to or less than a predetermined fourth threshold distance. Here, the fourth threshold distance may be determined to be smaller than the third threshold distance. The fourth threshold distance may be determined based on the information included in the received channel management broadcast packet. The neighbor channel interference by the third-fourth node pair may vary according to the first transmission power used in one-to-one communication of the third-fourth node pair. Alternatively, the neighbor channel interference by the third-fourth node pair may vary according to a difference in frequencies used for one-to-one communications of the first-second node pair and the third-fourth node pair. The fourth threshold distance may be determined as a different value based on the information on the first one-to-one channel resource, the information on the first transmission power, and the like.

For example, the first communication node may predict that the distance between the first-second node pair and the third-fourth node pair is to be equal to or less than the fourth threshold distance after a second time elapses. Accordingly, the first communication node may determine that reallocation of the second one-to-one channel resource needs to be performed before the second time elapses and the distance between the first-second node pair and the third-fourth node pair becomes less than or equal to the fourth threshold distance. Here, the reallocation of the second one-to-one channel resource may be performed so that the time resource number of the reallocated second one-to-one channel resource has a different value from the time resource number of the first one-to-one channel resource.

When it is determined that reallocation of the second one-to-one channel resource is required according to the step S960, the first communication node may perform the reallocation of the second one-to-one channel resource based on the determination result (S965). On the other hand, when it is determined that the reallocation of the second one-to-one channel resource is not required according to the step S960, the first communication node may terminate the operations according to an exemplary embodiment of the channel resource management method in the communication system described with reference to FIG. 9. Alternatively, when it is determined that the reallocation of the second one-to-one channel resource is not required according to the step S960, the first communication node may perform the operations according to the steps S940 to S960 again, and continuously determine whether the reallocation of the second one-to-one channel resource is required.

According to an exemplary embodiment of the present disclosure, terminals such as drones constituting a synchronous wireless distributed communication system may receive broadcast packets periodically transmitted from other terminals, and may manage one-to-one channel resources to be used by themselves based on one-to-one channel information included in the received broadcast packets. Thus, each of the terminals may select and allocate a one-to-one channel resource having little effect of collision or interference with a one-to-one channel already in use by another terminal from among one-to-one channel resources constituting a multi-channel resource structure. Each of the terminals may select and allocate a resource robust to a change in a communication environment from among the one-to-one channel resources constituting the multi-channel resource structure. Each of the terminals may perform re-allocation of a one-to-one channel resource when identifying collision or interference with a one-to-one channel resource being used. Accordingly, communication efficiency of the synchronous wireless distributed communication system can be improved.

However, the effects that can be achieved by the channel resource management method and apparatus in the wireless communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method for channel resource management performed by a first communication node in a communication system, the method comprising:
    monitoring channel information broadcast packets transmitted from other communication nodes;
    receiving a first broadcast packet, which is a channel information broadcast packet transmitted from a third communication node that is included in the other communication nodes and performs one-to-one communication with a second communication node included in the other communication nodes; and managing a one-to-one channel resource for one-to-one communication with a fourth communication node included in the other communication nodes based on information included in the first broadcast packet, wherein the first broadcast packet includes information on a first one-to-one channel resource allocated for one-to-one communication between the second and third communication nodes, wherein the managing of the second one-to-one channel resource comprises:

allocating the second one-to-one channel resource corresponding to a one-to-one channel resource for one-to-one communication directly with the fourth communication node;

re-monitoring channel information broadcast packets transmitted from other communication nodes;

receiving a second broadcast packet, which is a channel information broadcast packet transmitted again from the third communication node; and determining whether reallocation of the second one-to-one channel resource is required based on information included in the second broadcast packet, wherein the second broadcast packet includes information on a third one-to-one channel resource used for one-to-one communication directly between the second and third communication nodes at a time at which the second broadcast packet is transmitted, wherein the second broadcast packet further includes location information of the second communication node and location information of the third communication node at the time at which the second broadcast packet is transmitted, and the determining of whether reallocation of the second one-to-one channel resource is required comprises:

comparing the second one-to-one channel resource with the third one-to-one channel resource;

in response to determining that the second one-to-one channel resource and the third one-to-one channel resource are same, identifying a distance between a first node pair comprising the second and third communication nodes and a second node pair comprising the first and fourth communication nodes based on the location information of the second communication node and the location information of the third communication node;

comparing the distance between the first node pair and the second node pair with a first threshold distance; and in response to determining that the distance between the first node pair and the second node pair is less than or equal to the first threshold distance, determining that reallocation of the second one-to-one channel resource is required.

2. The method according to claim 1, wherein the channel information broadcast packet includes at least one of a location of a communication node transmitting the channel information broadcast packet, a location of a communication node performing one-to-one communication by forming a node pair with the communication node transmitting the channel information broadcast packet, a one-to-one channel resource being used for one-to-one communication of a node pair including the communication node transmitting the channel information broadcast packet, or information on a one-to-one transmission power corresponding to a transmission power used by the node pair including the communication node transmitting the channel information broadcast packet for transmission of a one-to-one communication signal.

3. The method according to claim 1, wherein the managing of the one-to-one channel resource comprises:

determining whether the first one-to-one channel resource included in the first broadcast channel is usable as a one-to-one channel resource for one-to-one communication with the fourth communication node; and allocating the second one-to-one channel resource corresponding to a one-to-one channel resource for one-to-one communication with the fourth communication node based on a result of the determining.

4. The method according to claim 3, wherein the first broadcast packet further includes location information of the second communication node and location information of the third communication node, and the determining whether the first one-to-one channel resource is usable comprises:

identifying a distance between a first node pair formed by the second and third communication nodes and a second node pair formed by the first and fourth communication nodes, based on the location information of the second communication node and the location information of the third communication node;

comparing the distance between the first node pair and the second node pair with a first threshold distance; and in response to determining that the distance between the first node pair and the second node pair is less than or equal to the first threshold distance, determining that the first one-to-one channel resource is unusable as a one-to-one channel resource for one-to-one communication with the fourth communication node.

5. The method according to claim 3, wherein the first broadcast packet further includes location information of the second communication node and location information of the third communication node, and the determining whether the first one-to-one channel resource is usable comprises:

identifying a distance between the second and third communication nodes based on the location information of the second communication node and the location information of the third communication node;

comparing the distance between the second and third communication nodes with a second threshold distance; and in response to determining that the distance between the second and third communication nodes exceeds the second threshold distance, determining that the first one-to-one channel resource is unusable as a one-to-one channel resource for one-to-one communication directly with the fourth communication node.

6. The method according to claim 3, wherein the first broadcast packet further includes information on a first one-to-one transmission power corresponding to a transmission power used by a first node pair comprising the second and third communication nodes for transmission of a one-to-one communication signal, and the determining whether the first one-to-one channel resource is usable comprises:

comparing the first one-to-one transmission power with a first threshold power; and in response to determining that the first one-to-one transmission power exceeds the first threshold power, determining that the first one-to-one channel resource is unusable as a one-to-one channel resource for one-to-one communication directly with the fourth communication node.

7. The method according to claim 1, wherein the second broadcast packet further includes location information of the second communication node and location information of the third communication node at the time at which the second broadcast packet is transmitted, and the determining whether reallocation of the second one-to-one channel resource is required comprises:
comparing the second one-to-one channel resource with the third one-to-one channel resource;
in response to determining that the second one-to-one channel resource and the third one-to-one channel resource are same, comparing a distance between the second and third communication nodes with a second threshold distance; and
in response to determining that the distance between the second and third communication nodes exceeds the second threshold distance, determining that reallocation of the second one-to-one channel resource is required.

8. The method according to claim 1, wherein the second broadcast packet further includes information on a second one-to-one transmission power corresponding to a transmission power used by a first node pair comprising the second and third communication nodes for transmission of a one-to-one communication signal at the time at which the second broadcast packet is transmitted, and the determining whether reallocation of the second one-to-one channel resource is required comprises:
comparing the second one-to-one channel resource with the third one-to-one channel resource;
in response to determining that the second one-to-one channel resource and the third one-to-one channel resource are same, comparing the second one-to-one transmission power with a first threshold power; and
in response to determining that the second one-to-one transmission power exceeds the first threshold power, determining that reallocation of the second one-to-one channel resource is required.

9. The method according to claim 1, wherein the second broadcast packet further includes movement path information of at least one of the second and third communication nodes.

10. The method according to claim 9, wherein the determining whether reallocation of the second one-to-one channel resource is required comprises:
comparing the second one-to-one channel resource with the third one-to-one channel resource;
in response to determining that the second one-to-one channel resource and the third one-to-one channel resource are same, identifying the movement path information of at least one of the second and third communication nodes based on information included in the second broadcast packet;
based on the movement path information of at least one of the second and third communication nodes, calculating a time at which a distance between a first node pair comprising the second and third communication nodes and a second node pair comprising the first and fourth communication nodes becomes equal to or less than a third threshold distance; and
determining that reallocation of the second one-to-one channel resource is required before the time at which the distance between the first node pair and the second node pair becomes less than or equal to the third threshold distance.

11. The method according to claim 9, wherein the determining whether reallocation of the second one-to-one channel resource is required comprises:
comparing the second one-to-one channel resource with the third one-to-one channel resource;
in response to determining that the second one-to-one channel resource and the third one-to-one channel resource have different frequency resource numbers and a same time resource number, identifying the movement path information of at least one of the second and third communication nodes based on the second broadcast packet;
based on the movement path information of at least one of the second and third communication nodes, calculating a time at which a distance between a first node pair comprising the second and third communication nodes and a second node pair comprising the first and fourth communication nodes becomes equal to or less than a fourth threshold distance; and
determining that reallocation of the second one-to-one channel resource is required before the time at which the distance between the first node pair and the second node pair becomes less than or equal to the fourth threshold distance.

12. The method according to claim 9, wherein the movement path information includes information on at least one waypoint (WP), and information on a time remaining until arriving at each of the at least one WP.

13. The method according to claim 1, wherein the third and fourth communication nodes are unmanned aerial vehicles, and the first and second communication nodes are control nodes for controlling the fourth and third communication nodes.

14. The method according to claim 1, wherein:
the first communication node and the fourth communication node are paired with each other in a first controller-controlled device relationship, and
the second communication node and the third communication node are paired with each other in a second controller-controlled device relationship.

15. A first communication node performing channel resource management in a communication system, the first communication node comprising:
a processor;
a memory communicatively connected with the processor; and
instructions stored in the memory,
wherein, when executed by the processor, the instructions cause the first communication node to:
monitor channel information broadcast packets transmitted from other communication nodes;
receive a first broadcast packet, which is a channel information broadcast packet transmitted from a third communication node that is included in the other communication nodes and performs one-to-one communication with a second communication node included in the other communication nodes; and
manage a one-to-one channel resource for one-to-one communication with a fourth communication node included in the other communication nodes based on information included in the first broadcast packet,
wherein:
the first broadcast packet includes information on a first one-to-one channel resource allocated for one-to-one communication between the second and third communication nodes, wherein the managing of the second one-to-one channel resource comprises:
  allocating a second one-to-one channel resource corresponding to a one-to-one channel resource for one-to-one communication with the fourth communication node;
  re-monitoring channel information broadcast packets transmitted from other communication nodes;
  receiving a second broadcast packet, which is a channel information broadcast packet transmitted again from the third communication node; and
  determining whether reallocation of the second one-to-one channel resource is required based on information included in the second broadcast packet,
wherein the second broadcast packet includes information on a third one-to-one channel resource used for one-to-one communication between the second and third communication nodes at a time at which the second broadcast packet is transmitted,
wherein the second broadcast packet further includes location information of the second communication node and location information of the third communication node at the time at which the second broadcast packet is transmitted, and the determining of whether reallocation of the second one-to-one channel resource is required comprises:
  comparing the second one-to-one channel resource with the third one-to-one channel resource;
  in response to determining that the second one-to-one channel resource and the third one-to-one channel resource are same, identifying a distance between a first node pair comprising the second and third communication nodes and a second node pair comprising the first and fourth communication nodes based on the location information of the second communication node and the location information of the third communication node;
  comparing the distance between the first node pair and the second node pair with a first threshold distance; and
  in response to determining that the distance between the first node pair and the second node pair is less than or equal to the first threshold distance, determining that reallocation of the second one-to-one channel resource is required.

16. The first communication node according to claim 15, wherein, when executed by the processor, the instructions further cause the first communication node to:
  determine whether the first one-to-one channel resource included in the first broadcast channel is usable as a one-to-one channel resource for one-to-one communication with the fourth communication node; and
  allocate the second one-to-one channel resource corresponding to a one-to-one channel resource for one-to-one communication with the fourth communication node based on a result of the determining.

17. The first communication node according to claim 15, wherein:
  the first communication node and the fourth communication node are paired with each other in a first controller-controlled device relationship, and
  the second communication node and the third communication node are paired with each other in a second controller-controlled device relationship.

* * * * *